(12) United States Patent
Hashimoto et al.

(10) Patent No.: US 6,786,634 B2
(45) Date of Patent: Sep. 7, 2004

(54) TEMPERATURE MEASURING METHOD AND APPARATUS

(75) Inventors: Miyuki Hashimoto, Ichinomiya (JP); Kenji Yano, Kasugai (JP); Misao Iwata, Nagoya (JP); Kuniyuki Kitagawa, Nagoya (JP); Norio Arai, deceased, late of Kasugai (JP), by Satoshi Arai, legal representative

(73) Assignees: Noritake Co., Limited, Nagoya (JP); Kuniyuki Kitagawa, Nagoya (JP)

( * ) Notice: Subject to any disclaimer, the term of this patent is extended or adjusted under 35 U.S.C. 154(b) by 0 days.

(21) Appl. No.: 10/263,839

(22) Filed: Oct. 4, 2002

(65) Prior Publication Data

US 2003/0067956 A1 Apr. 10, 2003

(30) Foreign Application Priority Data

Oct. 10, 2001 (JP) ........................................ 2001-312962
Oct. 10, 2001 (JP) ........................................ 2001-312963

(51) Int. Cl.$^7$ ................................................. G01J 5/00
(52) U.S. Cl. ........................ 374/127; 374/124; 374/121
(58) Field of Search ................................. 374/126, 121, 374/124, 127, 128, 137, 141; 356/43, 45; 250/351

(56) References Cited

U.S. PATENT DOCUMENTS

| 5,225,883 A | * | 7/1993 | Carter et al. | 356/45 |
|---|---|---|---|---|
| 5,876,121 A | * | 3/1999 | Burns et al. | 374/161 |
| 5,963,311 A | * | 10/1999 | Craig et al. | 356/43 |
| 5,994,701 A | * | 11/1999 | Tsuchimoto et al. | 374/120 |
| 2002/0030162 A1 | * | 3/2002 | Salisbury et al. | 250/330 |
| 2002/0146056 A1 | * | 10/2002 | Yano et al. | 374/127 |
| 2003/0107724 A1 | * | 6/2003 | Hashimoto et al. | 356/45 |

FOREIGN PATENT DOCUMENTS

| JP | 62274711 A | * 11/1987 | ................. 118/726 |
|---|---|---|---|
| JP | 62287124 A | * 12/1987 | ................. 374/121 |
| JP | 02245624 A | * 10/1990 | ................. 374/121 |
| JP | 05312653 A | * 11/1993 | ................. 356/43 |
| JP | 05332840 A | * 12/1993 | ................. 356/43 |
| JP | A 6-147989 | 5/1994 | |
| JP | A 6-258142 | 9/1994 | |

* cited by examiner

Primary Examiner—Christopher W. Fulton
Assistant Examiner—Mirellys Jagan
(74) Attorney, Agent, or Firm—Oliff & Berridge, PLC

(57) ABSTRACT

A method of measuring a temperature of an object body in an electric furnace, based on an intensity of a radiant energy emitted from the object body, the electric furnace being provided with an electric heater operable by application of a drive voltage thereto to heat the object body, the method comprising: a radiant-energy detecting step of detecting an intensity of a radiant energy emitted from the object body; a stray-light noise eliminating step of determining as a noise an intensity of a radiant energy of a stray light which is emitted from an inner wall surface of the electric furnace toward the object body and reflected by a surface of the object body, according to a predetermined relationship between the intensity of the radiant energy of the stray light and the drive voltage applied to the electric heater and based on an actually applied value of the drive voltage, and subtracting the intensity of the radiant energy of the stray light determined as the noise, from the detected intensity of the radiant energy emitted from the object body; and a temperature calculating step of calculating a temperature of the object body, based on the intensity of the radiant energy emitted from the object body from which the noise has been removed in the stray-light noise eliminating step. Also disclosed is an apparatus for practicing the method, which may include a shielding device disposed between the furnace walls and the object body.

9 Claims, 12 Drawing Sheets

TEMPERATURE MEASURING METHOD AND APPARATUS

This application is based on Japanese Patent Applications Nos. 2001-312962 and 2001-312963 both filed on Oct. 10, 2001, the contents of which are incorporated hereinto by reference.

BACKGROUND OF THE INVENTION

1. Field of the Invention

The present invention relates to a method and an apparatus which permit accurate measurement of temperature of an object body even in the case where the temperature of a wall such as a furnace wall surrounding the object body is different from that of the object body.

2. Discussion of Related Art

Temperature measuring methods of non-contact type are industrially useful and widely employed. To practice such non-contact type temperature measuring methods, there are known a radiation thermometer operable to effect a monochromatic temperature measurement, and a radiation thermometer operable to effect a dichroic temperature measruement. The former thermometer measures the temperature of an object body by comparing a radiant intensity value at one wavelength selected from an optical energy emitted from the object body with a reference value, which is a radiant intensity at the same wavelength of an optical energy emitted from a black body. Although this thermometer permits easy measurement of the temperature of the object body, it requires determination of the emissivity of the object body, and is not suitable for measuring temperature of an object body the emissivity of which changes. On the other hand, the latter thermometer can measure the temperature of an object body the emissivity of which is not unknown, since the temperature of the object body is determined on the basis of a ratio of radiant intensity values of two radiations having respective two different wavelengths selected from a radiant energy emitted from the object body, irrespective of the emissivity.

The radiation thermometers of non-contact type capable of monochromatic or dichroic temperature measurement or other non-contact type radiation thermometers may suffer from insufficient accuracy of the temperature measurement of the object body, due to a stray light noise undesirably included in the light radiated from the object body. More specifically described, the noise is a radiant energy of a stray light which is emitted toward a surface of the object body from the surroundings of the object body, e.g., inner wall surfaces of a furnace in which the object body is heated, and a heater or burner of the furnace. The stray light is reflected by the surface of the object body and incident on a photosensitive device of the radiation thermometer, so that the radiant intensity of the stray light is included in the detected radiant energy, namely, as a radiant energy as emitted from the object body itself. Thus, the detected temperature of the object body is adversely influenced by the radiant energy of the stray light. The degree of the adverse influence on the accuracy of measurement of the temperature of the object body increases with a rise in temperature of the inner wall surfaces of the furnace surrounding the object body, since the rise in the temperature of the surroundings causes an increase in the intensity of the radiant energy emitted from the inner wall surfaces of the furnace, as the stray light noise JP-A-6-147989 discloses a radiation temperature measuring apparatus of non-contact type which is arranged to measure the temperature of an object body, by detecting a radiant energy emitted from the object body located within a furnace through an inspection opening of a water-cooled shielding plate while a radiant energy emitted from the wall surface is cut or shut off by the shielding plate. This conventional apparatus is effective when the temperature within the furnace is a relatively low near the room temperature. However, where the temperature in the furnace is relatively high, the water-cooled shielding plate cools down the object body, leading to deterioration of the temperature measurement accuracy. JP-A-6-258142 discloses another radiation temperature measuring apparatus of non-contact type. This apparatus uses two radiation thermometers for detecting radiant energies emitted from an object body and a furnace wall, respectively. The radiant energy emitted from the furnace wall, which is detected by one of the two thermometers, is multiplied by a known emissivity value of the object body, and the product is determined as a noise component derived from a stray light. The temperature of the object body is calculated based on a value of the radiant energy emitted from the object body as detected by the other thermometer minus the noise component from the radiant energy emitted from the object body as detected by the other thermometer, minus the noise component. This apparatus suffers from a drawback that the measurement accuracy is not sufficiently high when the temperature distribution within the furnace wall is uneven, since the temperature of the furnace wall is detected by the radiation thermometer at only one local portion of the furnace wall. In an electric furnace, for example, the temperature is considerably higher at a heat-generating portion than at the other portions of the furnace. Therefore, to employ a radiant energy emitted from one local portion of the entire wall surface as a radiant energy emitted from the furnace wall as a whole leads to deterioration in the accuracy of measuring the temperature of the object body.

In the above-described situation, the inventors have carried out various studies. In view of the fact that where an electric furnace is provided with an electric heater for heating an object body, a radiant energy emitted inwardly from the inner wall surface of the electric furnace increases in proportion to a drive voltage applied to the electric heater, the inventors have found that a stray light noise can be effectively removed from a detected radiant intensity of the object body according to a predetermined relationship between a radiant intensity of a stray light, which is emitted toward and reflected by the object body, and the drive voltage applied to the electric heater; upon measurement of the object body temperature, the actual radiant intensity of the stray light is obtained based on the known drive voltage actually applied to the heater and according to the above-indicated predetermined relationship. Then, the obtained radiant intensity of the stray light is removed from the radiant intensity of the radiation from the object body as detected by a suitable device, to obtain the intensity of a radiant energy which is emitted from the object body and which does not include the stray light noise.

The inventors have also found that the intensity of a radiant energy of a stray light as a noise can be easily removed from a detected intensity value of a radiant energy emitted from the object body, by providing a furnace with a shielding device operable between an open state for permitting the stray light to reach the object body and a closed state for inhibiting the stray light from reaching the object body, between the inner wall surface of the furnace and the object body. In this case, the shielding device is held in its closed state, when the intensity of the radiant energy emitted from the object body in the furnace is detected for measurement of the temperature of the object body, so that the shielding device functions to establish an even distribution of the intensity of the radiant energy of the stray light emitted from the furnace wall (provided with burners or an electric heater). That is, the intensity of the radiant energy of the stray light is determined on the basis of the temperature of the shielding device. The thus determined noise or the intensity of the radiant energy of the stray light is eliminated from the detected intensity of the radiant energy emitted from the object body, to obtain a true or net value of the radiant intensity of the radiation which is emitted from the object body and which does not include the astray light noise.

SUMMARY OF THE INVENTION

The present invention has been developed in view of the findings discussed above. It is a first object of the present invention to provide a method which permits highly accurate measurement of a surface temperature of an object body in a furnace. A second object of the invention is to provide an apparatus suitable for practicing the method.

The first object may be achieved according to a first aspect of this invention, which provides a method of measuring a temperature of an object body in an electric furnace, based on an intensity of a radiant energy emitted from the object body, the electric furnace being provided with an electric heater operable by application of a drive voltage thereto to heat the object body, the method comprising: a radiant-energy detecting step of detecting an intensity of a radiant energy emitted from the object body; a stray-light noise eliminating step of determining as a noise an intensity of a radiant energy of a stray light which is emitted from an inner wall surface of the electric furnace toward the object body and reflected by a surface of the object body, according to a predetermined relationship between the intensity of the radiant energy of the stray light and the drive voltage applied to the electric heater and based on an actually applied value of the drive voltage, and subtracting the intensity of the radiant energy of the stray light determined as the noise, from the detected intensity of the radiant energy emitted from the object body; and a temperature calculating step of calculating a temperature of the object body, based on the intensity of the radiant energy emitted from the object body from which the noise has been removed in the stray-light noise eliminating step.

According to this first aspect of the invention, the intensity of the radiant energy of the stray light emitted from the inner wall surface of the electric furnace toward the object body and reflected by the object body is determined based on the drive voltage actually applied to the heater and according to the predetermined relationship between the radiant energy intensity and the drive voltage, and the radiant energy intensity of the stray light determined as a noise is removed from the detected intensity of the radiant energy emitted from the object body, in the stray-light noise eliminating step. Then, in the temperature calculating step, the temperature of the object body is calculated based on the intensity of the radiant energy from which the noise has been removed. This arrangement assures highly accurate measurement of the temperature of the object body in the electric furnace.

One preferable form of the first aspect of the invention is applicable to a dichroic measurement of a distribution of a surface temperature of the object body in the electric furnace, by calculating a temperature of the object body at each picture element of its image, on the basis of a radiant intensity ratio at each pair of corresponding picture elements of a first and a second image which are obtained with respective first and second radiations having respective first and a second wavelengths and selected from a light emitted from the surface of the object body. In this preferred from of the method, the radiant-energy detecting step comprises: a first-wavelength radiant-energy detecting step of detecting a radiant intensity of said first radiation at said each picture element, said first-wavelength radiant-energy detecting step including selecting said first radiation having said first wavelength from the light emitted from the surface of said object body, by using a first filter which permits transmission therethrough of said first radiation having said first wavelength which is selected according to a radiant-intensity curve corresponding to a wavelength of a black body at a lower limit of a range of the temperature to be measured, and which is within a high radiant intensity range in which the radiant intensity is higher than a radiant intensity at a normal room temperature, said first filter permitting transmission therethrough of a radiation having a half width which is not larger than $1/20$ of said first wavelength; and a second-wavelength radiant-energy detecting step of detecting a radiant intensity of said second radiation at said each picture element, said second-wavelength radiant-energy detecting step including selecting said radiation having said second wavelength from the light emitted from the surface of said object body, by using a second filter which permits transmission therethrough of said second radiation having said second wavelength which is selected within said high radiant intensity range, such that said second wavelength is different from said first wavelength by a predetermined difference which is not larger than $1/12$ of said first wavelength and which is not smaller than a sum of a half width of said second wavelength, and wherein said stray-light noise eliminating step comprises determining an intensity of a radiant energy of said stray light at each picture element of each of the first and second images, and subtracting the determined intensity of the radiant energy of the stray light at each picture element of each of the first and second images, from the intensity of the radiant energy emitted from the object body at the corresponding picture element obtained in a corresponding one of said first-wavelength radiant-energy detecting step and said second-wavelength radiant-energy detecting step, so as to obtain intensities of the radiant energies of the first and the second radiation at each picture element from which the intensity of the radiant energy of the stray light has been removed and said temperature calculating step comprises calculating the temperature of the object body at said each picture element, by obtaining, at said each picture element, a ratio of the intensity of the radiant energy of the first radiation from which the intensity of the radiant energy of the stray light has been removed, to the intensity of the radiant energy of the second radiation from which the intensity of the radiant energy of the stray light has been removed.

In the present method, the intensity of the radiant energy of the stray light which is a light emitted from the inner wall surface of the electric furnace toward the object body and reflected by the surface of the object body and which is included in the intensity of the radiant energy of each of the first and second radiations is first determined at each picture element, according to the predetermined relationship between the drive voltage applied to the electric heater of the electric furnace and the intensity of the radiant energy of the stray light, and based on the actual value of the applied voltage. The intensity of the radiant energy of the stray light is then eliminated from the intensity of the radiant energy of each of the first and second radiations at each picture element, which has been detected as the intensity of the radiant energy of the first or second radiation emitted from the object body. Based on the thus obtained intensity, the temperature of the object body at each picture element is calculated. Accordingly, the temperature of the surface of the object body located inside the electric furnace can be obtained with high accuracy. Further, in the above preferred form of the method, the temperature of the object body at each picture element of its image is calculated on the basis of the radiant intensity ratio at each pair of mutually corresponding the picture elements of the first and second images obtained with the respective first and second radiations having the respective first and second wavelengths selected from the light emitted from the surface of the object body. To select the first radiation having the first wavelength from the light emitted from the surface of the object body, the present method uses the first filter which permits transmission therethrough of the first radiation having the first wavelength which is selected according to the radiant-intensity curve corresponding to the wavelength of the black body at the lower limit of the range of the temperature to be measured, which is within the high radiant-intensity range in which the radiant intensity is higher than the radiant intensity at the normal room temperature, and which has a half width which is not larger than $\frac{1}{20}$ of the first wavelength. The present method further uses the second filter which permits transmission therethrough of the second radiation having the second wavelength which is selected within the above-indicated high radiant-intensity range, such that the second wavelength is different from the first wavelength by a predetermined difference which is not larger than $\frac{1}{12}$ of the first wavelength and which is not smaller than a sum of the half width of the first wavelength and the half width of the second wavelength. Accordingly, optical signals having sufficiently high radiation intensities can be obtained, leading to an accordingly high S/N ratio. In addition, the first and second wavelengths are close to each other, so that the principle of measurement according to the present invention fully matches the principle of measurement by a dichroic thermometer, namely, fully meets a prerequisite that the dependency of the emissivity on the wavelength can be ignored for two radiations the wavelengths of which are close to each other, leading to approximation $\epsilon_1 = \epsilon_2$. Thus, the present measuring method permits highly accurate measurement of the temperature distribution.

The second object may be achieved according to a second aspect of this invention, which provides an apparatus for measuring a temperature of an object body in an electric furnace, based on an intensity of a radiant energy emitted from the object body, the electric furnace being provided with an electric heater operable by application of a drive voltage thereto to heat the object body, the apparatus comprising: a radiant-energy detecting means for detecting an intensity of a radiant energy emitted from the object body; a stray-light noise eliminating means for determining as a noise an intensity of a radiant energy of a stray light which is emitted from an inner wall surface of the electric furnace toward the object body and reflected by a surface of the object body, according to a predetermined relationship between the intensity of the radiant energy of the stray light and the drive voltage applied to the electric heater, based on an actually applied value of the drive voltage, and subtracting the intensity of the radiant energy of the stray light determined as the noise, from the detected intensity of the radiant energy emitted from the object body; and a temperature calculating means for calculating a temperature of the object body, based on the intensity of the radiant energy emitted from the object body from which the noise has been removed by the stray-light noise eliminating means.

According to this second aspect of the invention, the intensity of the radiant energy of the stray light emitted from the inner wall surface of the electric furnace toward the object body and reflected by the object body is first determined based on the drive voltage actually applied to the electric heater according to the predetermined relationship between the radiant energy intensity and the drive voltage, and the intensity of the radiant energy of the stray light determined as a noise is removed from the detected intensity of the radiant energy emitted from the object body. Then, the temperature calculating means calculates the temperature of the object body, based on the intensity of the radiant energy from which the noise has been removed. This arrangement assures highly accurate measurement of the temperature of the object body in the electric furnace.

One preferable form of the second aspect of the invention is a dichroic measurement of a distribution of a surface temperature of the object body in the electric furnace, by calculating a temperature of the object body at each picture element of its image, on the basis of a radiant intensity ratio at each pair of corresponding picture elements of a first and a second image which are obtained with respective first and second radiations having respective first and second wavelengths and selected from a light emitted from the surface of the object body. In this preferred form of the apparatus, the radiant-energy detecting means comprises: first-wavelength radiant-energy detecting means for detecting a radiant intensity of the first radiation at the each picture element, the first-wavelength radiant-energy detecting means including selecting the first radiation having the first wavelength from the light emitted from the surface of the object body, by using a first filter which permits transmission therethrough of the first radiation having the first wavelength which is selected according to a radiant-intensity curve corresponding to a wavelength of a black body at a lower limit of a range of the temperature to be measured, and which is within a high radiant intensity range in which the radiant intensity is higher than a radiant intensity at a normal room temperature, the first filter permitting transmission therethrough of a radiation having a half width which is not larger than $\frac{1}{20}$ of the first wavelength; and a second-wavelength radiant-energy detecting means for detecting a radiant intensity of the second radiation at the each picture element, the second-wavelength radiant-energy detecting means including selecting the radiation having the second wavelength from the light emitted from the surface of the object body, by using a second filter which permits transmission therethrough of the second radiation having the second wavelength which is selected within the high radiant intensity range, such that the second wavelength is different from the first wavelength by a predetermined difference which is not larger than $\frac{1}{12}$ of the first wavelength and which is not smaller than a sum of a half width of the second wavelength, and wherein the stray-light noise eliminating means comprises determining an intensity of a radiant energy of the stray light at each picture element of each of the first and second images, and subtracting the determined intensity of the radiant energy of the stray light at each picture element of each of the first and second images, from the intensity of the radiant energy emitted from the object body at the corresponding picture element obtained in a corresponding one of the first-wavelength radiant-energy detecting means and the second-wavelength radiant-energy detecting means, so as to obtain intensities of the radiant energies of the first and the second radiation at each picture element from which the intensity of the radiant energy of the stray light has been removed and the temperature calculating means comprises calculating the temperature of the object body at the each picture element, by obtaining, at the each picture element, a ratio of the intensity of the radiant energy of the first radiation from which the intensity of the radiant energy of the stray light has been removed, to the intensity of the radiant energy of the second radiation from which the intensity of the radiant energy of the stray light has been removed.

In the present apparatus, the intensity of the radiant energy of the stray light, which is a light emitted from the inner wall surface of the electric furnace toward the object body and reflected by the surface of the object body and which is included in the intensity of the radiant energy of each of the first and second radiations is first determined at each picture element, according to the predetermined relationship between the drive voltage applied to the electric heater of the electric furnace and the intensity of the radiant energy of the stray light, and based on the actual value of the applied voltage. The intensity of the radiant energy of the stray light at each picture element is then eliminated from the intensity of the radiant energy of each of the first and second radiations at each picture element, which has been detected as the intensity of the radiant energy of the first or second radiation emitted from the object body. Based on the thus obtained intensity, the temperature of the object body at each picture element is calculated. Accordingly, the temperature of the surface of the object body located inside the electric furnace can be obtained with high accuracy. Further, in the above preferred form of the apparatus, the temperature of the object body at each picture element of its image is calculated on the basis of the radiant intensity ratio at each pair of mutually corresponding two picture elements of the first and second images and obtained with the respective first and second radiations having the respective first and second wavelengths selected from the light emitted from the surface of the object body. To select the first radiation having the first wavelength from the light emitted from the surface of the object body, the present apparatus uses the first filter which permits transmission therethrough of the first radiation having the first wavelength which is selected according to the radiant-intensity curve corresponding to the wavelength of the black body at the lower limit of the range of the temperature to be measured, which is within the high radiant-intensity range in which the radiant intensity is higher than the radiant intensity at the normal room temperature, and which has a half width which is not larger than $1/20$ of the first wavelength. The present apparatus further uses the second filter which permits transmission therethrough of the second radiation having the second wavelength which is selected within the above-indicated high radiant-intensity range, such that the second wavelength is different from the first wavelength by a predetermined difference which is not larger than $1/12$ of the first wavelength and which is not smaller than a sum of the half width of the first wavelength and the half width of the second wavelength. Accordingly, optical signals having sufficiently high radiation intensities can be obtained, leading to an accordingly high S/N ratio of the apparatus. In addition, the first and second wavelengths are close to each other, so that the principle of measurement according to the present invention fully matches the principle of measurement by a dichroic thermometer, namely, fully meets a prerequisite that the dependency of the emissivity on the wavelength can be ignored for two radiations the wavelengths of which are close to each other, leading to approximation $\epsilon_1 = \epsilon_2$. Thus, the present measuring apparatus permits highly accurate measurement of the temperature distribution.

The first object body may be achieved according to a third aspect of this invention, which provides a method of measuring a temperature of an object body in a heating furnace, based on an intensity of a radiant energy emitted from the object body, the method comprising: a heating step of heating the object body while a shielding device disposed between the object body and an inner wall surface of the heating furnace and operable between an open state for permitting a stray light to be emitted from an inner wall surface of the heating furnace and a closed state for inhibiting the stray light from reaching the object body, is held in the open state; a radiant-energy detecting step of detecting an intensity of a radiant energy emitted from the object body while the shielding device is held in the closed state; and a temperature calculating step of calculating a temperature of the object body, based on the intensity of the radiant energy emitted from the object body detected in the radiant-energy detecting step.

In this method, the object body is heated while the shielding device located between the object body and the furnace wall is held in the open state in the heating step, and then the intensity of the radiant energy emitted from the object body is detected while the shielding device is held in the closed state, in the radiant-energy detecting step. In the following temperature calculating step, the temperature of the object body is obtained, based on the thus detected intensity of the radiant energy emitted from the object body. According to this method, the intensity of the radiant energy of the stray light emitted from the furnace wall toward the object body is evenly distributed in the presence of the shielding device held in its closed state, during the detection of the intensity of the radiant energy emitted from the object body. An intensity of the noise (radiant energy of the stray light) is determined according to a predetermined relationship between the temperature of the shielding device and the determined intensity of the radiant energy of the stray light, and based on the intensity of the radiant energy of the stray light. Accordingly, the stray light noise can be easily removed from the intensity of the radiant energy detected as the intensity of the radiant energy emitted from the object body, enhancing the accuracy of the measurement of surface temperature of the object body.

One preferable form of the third aspect of the invention is applicable to a dichroic measurement of a distribution of a surface temperature of the object body in the electric furnace, by calculating a temperature of the object body at each picture element of its image, on the basis of a radiant intensity ratio at each pair of corresponding picture elements of a first and a second image which are obtained with respective first and second radiations having respective first and a second wavelengths and selected from a light emitted from the surface of the object body. In this preferred from of the method, the heating step comprises heating the object body while the shielding device disposed between the object body and an inner wall surface of the heating furnace is held in the open state; the radiant-energy detecting step comprises: a first-wavelength radiant-energy detecting step of detecting a radiant intensity of the first radiation at the each picture element while the shielding device is held in the closed state, the first-wavelength radiant-energy detecting step including selecting the first radiation having the first wavelength from the light emitted from the surface of the object body, by using a first filter which permits transmission therethrough of the first radiation having the first wavelength which is selected according to a radiant-intensity curve corresponding to a wavelength of a black body at a lower limit of a range of the temperature to be measured, and which is within a high radiant intensity range in which the radiant intensity is higher than a radiant intensity at a normal room temperature, the first filter permitting transmission therethrough of a radiation having a half width which is not larger than $1/20$ of the first wavelength; and a second-wavelength radiant-energy detecting step of detecting a radiant intensity of the second radiation at the each picture element while the shielding device is held in the closed state, the second-wavelength radiant-energy detecting step including selecting the radiation having the second wavelength from the light emitted from the surface of the object body, by using a second filter which permits transmission therethrough of the second radiation having the second wavelength which is selected within the high radiant intensity range, such that the second wavelength is different from the first wavelength by a predetermined difference which is not larger than $1/12$ of the first wavelength and which is not smaller than a sum of a half width of the second wavelength; and wherein the temperature calculating step comprises calculating the temperature of the object body at the each picture element, by obtaining, at the each picture element, a ratio of the intensity of the radiant energy of the first radiation detected in the first-wavelength radiant-energy detecting step, to the intensity of the radiant energy of the second radiation detected in the second-wavelength radiant-energy detecting step.

In this preferred from of the method, the shielding device is held open in the heating step for heating the object body, and then brought into its closed state and held in this closed state in the first-wavelength radiant-energy detecting step and the second-wavelength radiant-energy detecting step for detecting the intensities of the radiant energies of the first and second radiations having the respective first and second wavelengths which are selected from the light emitted from the object body. In the following temperature calculating step, the temperature of the object body is calculated at each picture element, based on the thus obtained intensities of the radiant energies of the first and second radiations, that is, a ratio of the intensity of the radiant energy of the first radiation to the intensity of the radiant energy of the second radiation. According to this method, the stray light noise (the intensity of the radiant energy of the stray light) emitted from the furnace wall toward the object body and reflected by the surface of the object body, which noise is included in the intensity of the radiant energy detected as the intensity of the radiant energy emitted from the object body, is evenly distributed by the shielding device, and the intensity of the stray light noise is determined based on the temperature of the shielding device. Then, the noise or the intensity of the radiant energy of the stray light is eliminated from the detected intensity of the radiant energy emitted from the object body. This method thus enhances the accuracy of measuring the surface temperature of the object body. Further, in the above preferred form of method, the temperature of the object body at each picture element of its image is calculated on the basis of the radiant intensity ratio at each pair of mutually corresponding two picture elements of the first and second images and obtained with the respective first and second radiations having the respective first and second wavelengths selected from the light emitted from the surface of the object body. To select the first radiation having the first wavelength from the light emitted from the surface of the object body, the present method uses the first filter which permits transmission therethrough of the first radiation having the first wavelength which is selected according to the radiant-intensity curve corresponding to the wavelength of the black body at the lower limit of the range of the temperature to be measured, which is within the high radiant-intensity range in which the radiant intensity is higher than the radiant intensity at the normal room temperature, and which has a half width which is not larger than $1/20$ of the first wavelength. The present invention further uses the second filter which permits transmission therethrough of the second radiation having the second wavelength which is selected within the above-indicated high radiant-intensity range, such that the second wavelength is different from the first wavelength by a predetermined difference which is not larger than $1/12$ of the first wavelength and which is not smaller than a sum of the half width of the first wavelength and the half width of the second wavelength. Accordingly, optical signals having sufficiently high radiation intensities can be obtained, leading to an accordingly high S/N ratio. In addition, the first and second wavelengths are close to each other, so that the principle of measurement according to the present invention fully matches the principle of measurement by a dichroic thermometer, namely, fully meets a prerequisite that the dependency of the emissivity on the wavelength can be ignored for two radiations the wavelengths of which are close to each other, leading to approximation $\epsilon_1 = \epsilon_2$. Thus, the present measuring method permits highly accurate measurement of the temperature distribution.

The second object may be achieved according to a fourth aspect of this invention, which provides an apparatus for measuring a temperature of an object body in a heating furnace, based on an intensity of a radiant energy emitted from the object body, the apparatus comprising: a shielding device provided between the object body and an inner wall surface of the heating furnace and operable between an open state for permitting a stray light to be emitted from the inner wall surface to reach the object body and a closed state for inhibiting the stray light from reaching the object body; a radiant-energy detecting means for detecting an intensity of a radiant energy emitted from the object body while the shielding device is held in the closed state; and a temperature calculating means for calculating a temperature of the object body, based on the intensity of the radiant energy emitted from the object body detected by the radiant-energy detecting means.

According to the fourth aspect of the invention, the intensity of the radiant energy emitted from the object body is detected by the radiant-energy detecting means while the shielding device disposed between the object body and the furnace wall, and the temperature of the object body is calculated by the temperature calculating means, based on the thus detected intensity of the radiant energy. According to this arrangement, the intensity of the noise (the radiant energy of the stray light) emitted from the furnace wall toward the object body is evenly distributed in the presence of the shielding device held in its closed state during the detection of the intensity of the radiant energy emitted from the object body. The intensity of the radiant energy of the stray light can be determined according to a predetermined relationship between a temperature of the shielding device and the intensity of the radiant energy of the stray light, and based on the thus determined value of the intensity of the radiant energy of the stray light. Accordingly, the stray light noise can be easily removed from the intensity of the radiant energy detected as the intensity of the radiant energy emitted from the object body, enhancing the accuracy of the measurement of the surface temperature of the object body.

One preferable form of the fourth aspect of the invention is a dichroic measurement of a distribution of a surface temperature of the object body in the electric furnace, by calculating a temperature of the object body at each picture element of its image, on the basis of a radiant intensity ratio at each pair of corresponding picture elements of a first and a second image which are obtained with respective first and second radiations having respective first and second wavelengths and selected from a light emitted from the surface of the object body. In this preferred form of the apparatus, the radiant-energy detecting means comprises: a first-wavelength radiant-energy detecting means for detecting a radiant intensity of the first radiation at the each picture element while the shielding device is held in the closed state, the first-wavelength radiant-energy detecting means including selecting the first radiation having the first wavelength from the light emitted from the surface of the object body, by using a first filter which permits transmission therethrough of the first radiation having the first wavelength which is selected according to a radiant-intensity curve corresponding to a wavelength of a black body at a lower limit of a range of the temperature to be measured, and which is within a high radiant intensity range in which the radiant intensity is higher than a radiant intensity at a normal room temperature, the first filter permitting transmission therethrough of a radiation having a half width which is not larger than $1/20$ of the first wavelength; and a second-wavelength radiant-energy detecting means for detecting a radiant intensity of the second radiation at the each picture element while the shielding device is held in the closed state, the second-wavelength radiant-energy detecting means including selecting the radiation having the second wavelength from the light emitted from the surface of the object body, by using a second filter which permits transmission therethrough of the second radiation having the second wavelength which is selected within the high radiant intensity range, such that the second wavelength is different from the first wavelength by a predetermined difference which is not larger than $1/12$ of the first wavelength and which is not smaller than a sum of a half width of the second wavelength, and wherein the temperature calculating means comprises calculating the temperature of the object body at the each picture element, by obtaining, at the each picture element, a ratio of the intensity of the radiant energy of the first radiation detected by the first-wavelength radiant-energy detecting means, to the intensity of the radiant energy of the second radiation detected by the second-wavelength radiant-energy detecting means.

In this apparatus, the shielding device is held open by the heating means during heating of the object body, and then brought into the closed state and held in the closed state while the first-wavelength radiant-energy detecting means and the second-wavelength radiant-energy detecting means respectively detect the intensities of the radiant energies of the first and second radiations having the respective first and second wavelengths selected from the light emitted from the object body. Next, the temperature calculating means calculates the temperature of the object body at each picture element, based on the thus detected intensities of the radiant energies of the first and second radiations, that is, a ratio of the intensity of the radiant energy of the first radiation to the intensity of the radiant energy of the second radiation. According to this arrangement, the noise or intensity of the radiant energy of the stray light emitted from the furnace wall toward the object body and reflected by the surface of the object body, which noise is included in the intensity of the radiant energy detected as the intensity of the radiant energy emitted from the object body, is evenly distributed by the shielding device, and the intensity of the stray light noise is determined based on the temperature of the shielding device. Then, the noise or the intensity of the radian energy of the stray light is eliminated from the detected intensity of the radiant energy emitted from the object body. This arrangement thus enhances the accuracy of measuring the surface temperature of the object body. Further, in the above apparatus, the temperature of the object body at each picture element of its image is calculated on the basis of the radiant intensity ratio at each pair of mutually corresponding two picture elements of the first and second images obtained with the respective first and second radiations having the respective first and second wavelengths selected from the light emitted from the surface of the object body. To select the first radiation having the first wavelength from the light emitted from the surface of the object body, the present apparatus uses the first filter which permits transmission therethrough of the first radiation having the first wavelength which is selected according to the radiant-intensity curve corresponding to the wavelength of the black body at the lower limit of the range of the temperature to be measured, which is within the high radiant-intensity range in which the radiant intensity is higher than the radiant intensity at the normal room temperature, and which has a half width of which is not larger than $1/20$ of the first wavelength. The present invention further uses the second filter which permits transmission therethrough of the second radiation having the second wavelength which is selected within the above-indicated high radiant-intensity range, such that the second wavelength is different from the first wavelength by a predetermined difference which is not larger than $1/12$ of the first wavelength and which is not smaller than a sum of the half width of the first wavelength and the half width of the second wavelength. Accordingly, optical signals having sufficiently high radiation intensities can be obtained, leading to an accordingly high S/N ratio of the apparatus. In addition, the first and second wavelengths are close to each other, so that the principle of measurement according to the present invention fully matches the principle of measurement by a dichroic thermometer, namely, fully meets a prerequisite that the dependency of the e-missivity on the wavelength can be ignored for two radiations the wavelengths of which are close to each other, leading to approximation $\epsilon_1 = \epsilon_2$. Thus, the present measuring apparatus permits highly accurate measurement of the temperature distribution.

In each of the preferred forms of the methods and apparatuses according to the first to fourth aspects of the present invention, the first and second filters are preferably arranged such that the first filter permits transmission therethrough of the radiation having the half width which is not larger than $1/20$ of the first wavelength, while the second filter permits transmission therethrough of the radiation having the half width which is not larger than $1/20$ of the second wavelength. According to this arrangement, the radiations having the first and second wavelengths are considered to exhibit a sufficiently high degree of monochromatism. Therefore, the present invention meets the prerequisite for the principle of measurement by a dichroic thermometer, resulting in an improved accuracy of measurement of the temperature distribution.

The first and second filters used in the temperature measuring methods and apparatuses according to the first to fourth aspects of the invention are preferably arranged such that the first and second filters have transmittance values whose difference is not higher than 30%. This arrangement assures high sensitivity and S/N ratio, even for one of the two radiations of the first and second wavelengths which has a lower luminance value, permitting accurate measurement of the temperature distribution.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

There will be described several embodiments of the present invention referring to the accompanying drawings.

Figure 1:
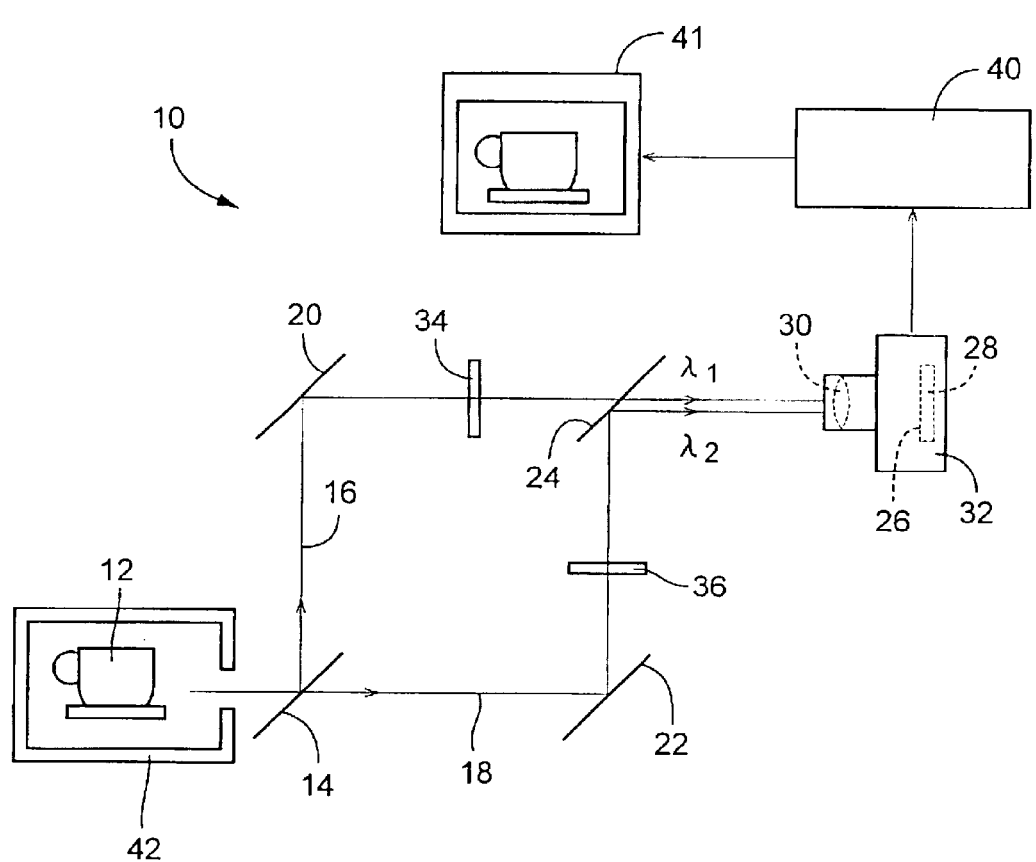
FIG. 1 is a view schematically illustrating an arrangement of a temperature-distribution measuring apparatus constructed according to a first embodiment of this invention.

Referring first to FIG. 1, there is shown an arrangement of a temperature-distribution measuring apparatus 10 as a first embodiment of this invention, wherein a light emitted or radiated from a surface of an object body 12 in a firing furnace or a heating furnace in the form of an electric furnace 42 is split by a half mirror (beam splitter) 14 into a first component traveling along a first optical path 16 and a second component traveling along a second optical path 18. The first and second optical paths 16, 18 are bent substantially at right angles by respective mirrors 20, 22, so that the first and second components are both incident upon a half mirror 24, and are reflected by the half mirror 24, so as to be incident upon an image detector 32 which has a CCD device 28 and a lens device 30. The CCD device 28 has a light detecting surface 26 on which are arranged a multiplicity of photosensitive elements. The lens device 30 is arranged to focus images of the object body 12 on the light detecting surface 26.

The first optical path 16 is provided with a first filter 34 which permits transmission therethrough of a radiation having a first wavelength (band) $\lambda_1$ (e.g., center wavelength of 600 nm) and a half width of about 10 nm, for example. The second optical path 18 is provided with a second filter 36 which permits transmission therethrough of a radiation having a second wavelength (band) $\lambda_2$ (e.g., center wavelength of 650 nm) and a half width of about 10 nm, for example. The first and second filters 34, 36 are so-called "interference filters" permitting transmission of radiations in selected wavelength bands, utilizing an optical interference.

Figure 2:
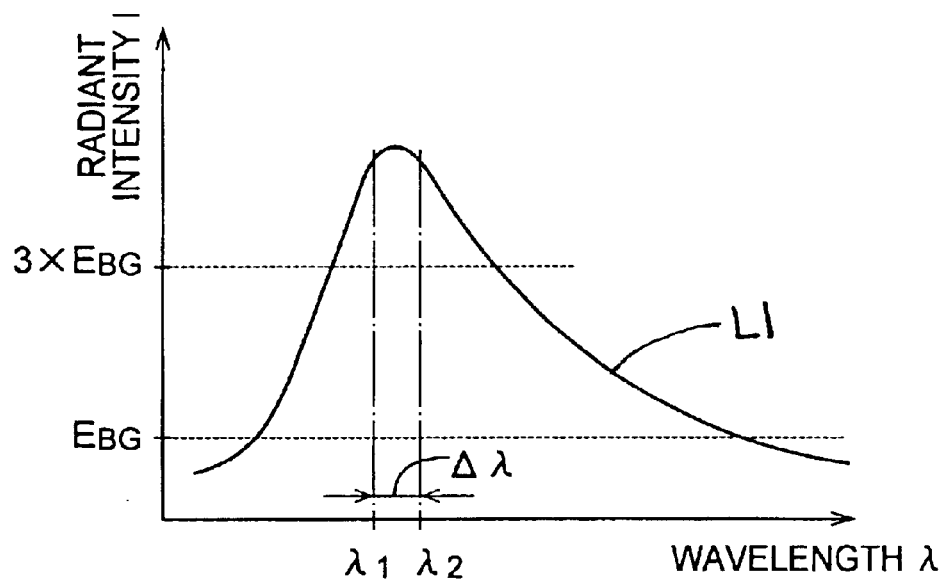
FIG. 2 is a view for explaining a manner of determining wavelengths $\lambda_1$ and $\lambda_2$ of respective first and second filters shown in FIG. 1.

The first and second wavelengths $\lambda_1$ and $\lambda_2$ are determined in the following manner, for instance. Initially, there is obtained according to the Planck's law a relationship between a wavelength and a radiant intensity of a black body at a lower limit (e.g., 500° C.) of a range of the temperature to be measured. Namely, a curve L1 shown in FIG. 2 is obtained. Then, a background radiant intensity $E_{BG}$ of the object body 12 is measured at a room temperature, for example, at 25° C. Next, the wavelength $\lambda$ at a desired point which lies on a portion of the curve L1 and which is larger than the background radiant intensity $E_{BG}$ multiplied by three, that is, larger than a value $3 \times E_{BG}$ is determined to be the first wavelength $\lambda_1$, so that the radiant intensity used for the measurement is high enough to prevent an error of measurement of the temperature. Then, the second wavelength $\lambda_2$ is determined to be larger or smaller than the first wavelength $\lambda_1$ by a predetermined difference $\Delta\lambda$, which is not larger than $\frac{1}{12}$ of the first wavelength $\lambda_1$. Where the first wavelength $\lambda_1$ is 600 nm, for example, the second wavelength $\lambda_2$ is determined to be 650 nm, which is larger than the first wavelength $\lambda_1$ by 50 nm. This manner of determination of the first and second wavelengths $\lambda_1$ and $\lambda_2$ is intended to satisfy an approximating equation (4) which represents the principle of measurement of a dichroic thermometer, which will be described. It is noted that the difference $\Delta\lambda$ between the first and second wavelengths $\lambda_1$ and $\lambda_2$ must be equal to or larger than a value two times as large as a half width described below, in order to maintain a high degree of accuracy of measurement of the radiant intensity. For the radiations of the first and second radiations $\lambda_1$ and $\lambda_2$ to maintain properties of a monochromic light, the half widths must be equal to or smaller than 1/20 of the center wavelengths, for example, equal to or smaller than about 20 nm. Further, the first and second filters 34, 36 have transmittance values whose difference is 30% or lower. If the difference were higher than 30%, the sensitivity of one of the two radiations of the first and second wavelengths $\lambda_1$, $\lambda_2$ which has a lower luminance value would be lowered, resulting in a reduced S/N ratio of the image detector 32 and an accordingly reduced accuracy of display of the temperature.

Thus, the temperature-distribution measuring apparatus 10 according to the present embodiment is arranged to select the two radiations having the respective first and second wavelengths $\lambda_1$ and $\lambda_2$ from the light emitted from the surface of the object body 12. To this end, the first filter 34 permits transmission therethrough of the radiation having the first wavelength $\lambda_1$ and the first half width which is not larger than 1/20 of that wavelength. The first wavelength $\lambda_1$ is selected according to the radiant-intensity curve L1 corresponding to the wavelength of a black body at the lower limit of the range of the temperature to be measured, and within a high radiant-intensity range in which the radiant intensity is sufficiently higher than the background radiant intensity EBG at a normal room temperature. On the other hand, the second filter 36 permits transmission therethrough of the radiation having the second wavelength $\lambda_2$ and the second half width which is not larger than 1/20 of the second wavelength. The second wavelength $\lambda_2$ is selected within the above-indicated high radiant-intensity range, such that the second wavelength $\lambda_2$ is different from the first wavelength $\lambda_1$ by a predetermined difference which is not larger than 1/12 of the first wavelength $\lambda_1$ and which is not smaller than a sum of the above-indicated first and second half widths.

Figure 3:
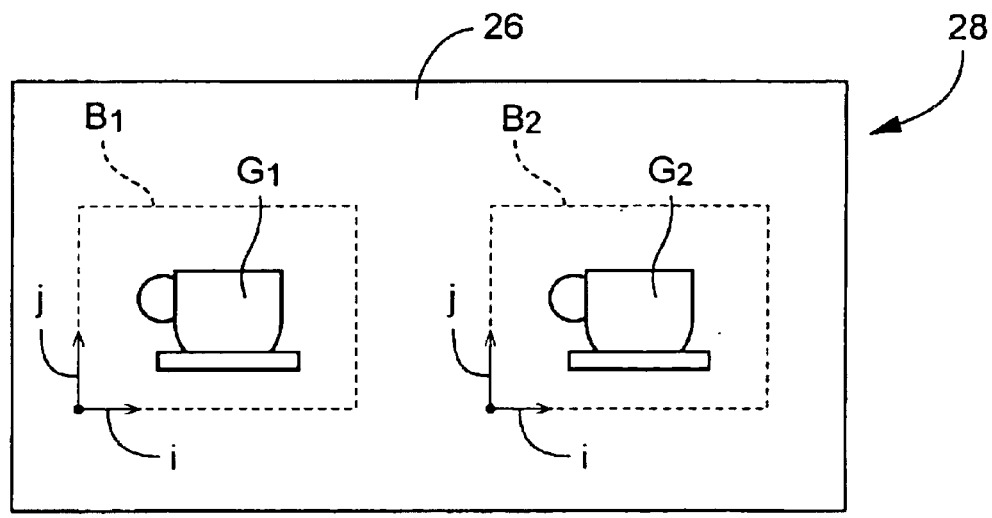
FIG. 3 is a view for explaining first and second images $G_1$ and $G_2$ formed on a light detecting surface 26 of an image detector 32 shown in FIG. 1.

In the optical system of FIG. 1, portions of the first and second optical paths 16, 18 between the half mirror 24 and the image detector 32 are spaced from each other by a small distance in a direction parallel to the light detecting surface 26 of the CCD device 28, in order to prevent overlapping of first and second images $G_1$ and $G_2$ formed on the light detecting surface 26. This spaced-apart relation of the optical paths 16, 18 is established by suitably orienting the respective mirrors 20, 22, so that the first and second images $G_1$ and $G_2$ of respective different wavelengths are formed on the light detecting surface 26 in a spaced-apart relation with each other. Described in detail by reference to FIG. 3, the first image $G_1$ is formed at a first position $B_1$ on the light detecting surface 26 of the CCD device 28 of the image detector 32, with the radiation having the first wavelength $\lambda_1$ selected by the first filter 34 from the light emitted from the surface of the object body 12, while the second image $G_2$ is formed at a second position $B_2$ on the light detecting surface 26, with the radiation having the second wavelength $\lambda_2$ selected by the second filter 36 from the light emitted from the surface of the object body 12, such that the first and second positions $B_1$ and $B_2$ are spaced apart from each other in the direction parallel to the light detecting surface 26, as indicated in FIG. 3. According to this arrangement, the multiple photosensitive elements arranged on the light detecting surface 26 detect the radiant intensity values at respective picture elements of the first image $G_1$, and the radiant intensity values at respective picture elements of the second image $G_2$, such that the picture elements correspond to the respective photosensitive elements. The mirrors 20, 22, half mirrors 14, 24 and lens device 30 cooperate with each other to constitute an optical imaging device capable of performing first and second wavelength-selecting steps of selecting the first and second wavelengths for concurrently forming respective images of the object body 12 at respective positions.

The arithmetic control device 40 is a microcomputer incorporating a central processing unit (CPU), a random-access memory (RAM), a read-only memory (ROM) and an input-output interface. The CPU operates according to a control program stored in the ROM, to process input signals, namely, the output signals of the multiple photosensitive elements arranged on the light detecting surface 26, and control an image display device 41 to display a distribution of the surface temperature of the object body 12.

Figure 4:
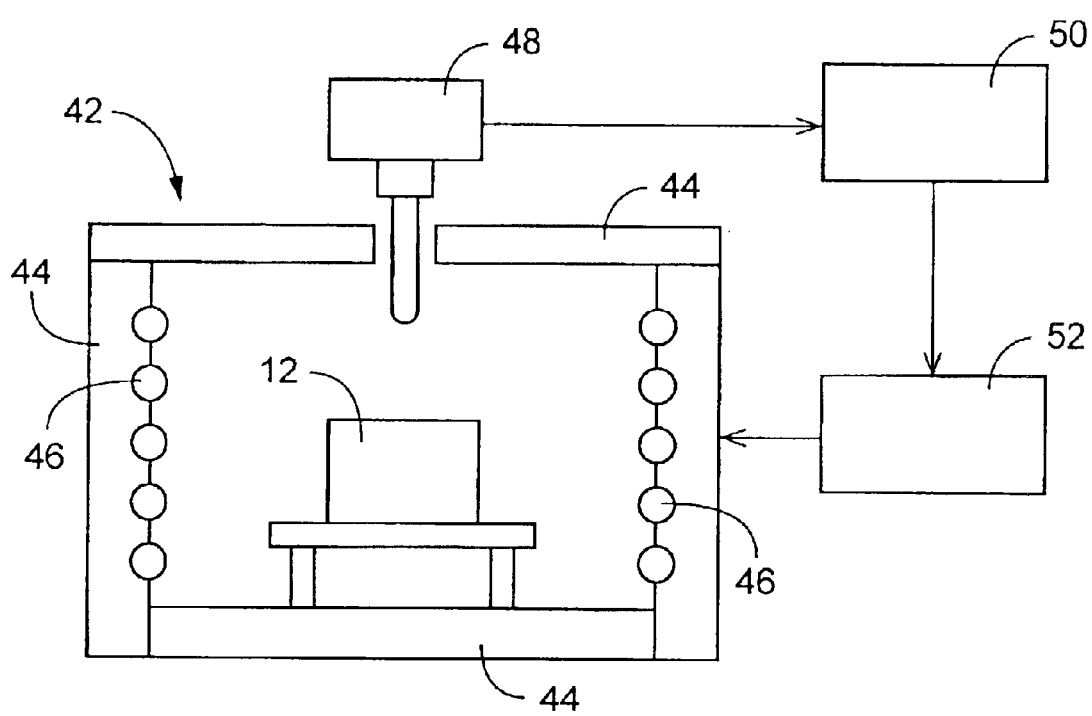
FIG. 4 is a view schematically illustrating an arrangement of an electric furnace 42 of the apparatus of FIG. 1.

In FIG. 4, there is schematically shown the above-indicated electric furnace 42 for heating the object body 12. The electric furnace 42 comprises furnace walls 44 in which the object body 12 is accommodated, an electric heater 46, and a thermometer 48 in the form of a thermocouple for detecting a temperature Tin inside the electric furnace 42. The furnace walls 44 are made of an inorganic heat insulating material, such as a refractory brick. The electric heater 46 is provided on the inner surface of the side wall 44. Reference numeral 50 denotes a temperature adjusting device for controlling the temperature Tin inside the electric furnace 42 by controlling an electric control signal to be applied to a driver circuit 52 connected to the electric heater 46, to adjust a drive voltage V to be applied to the electric heater 46 so that the temperature Tin as detected by the radiation thermometer 48 coincides with a predetermined target value Tm.

Figure 5:
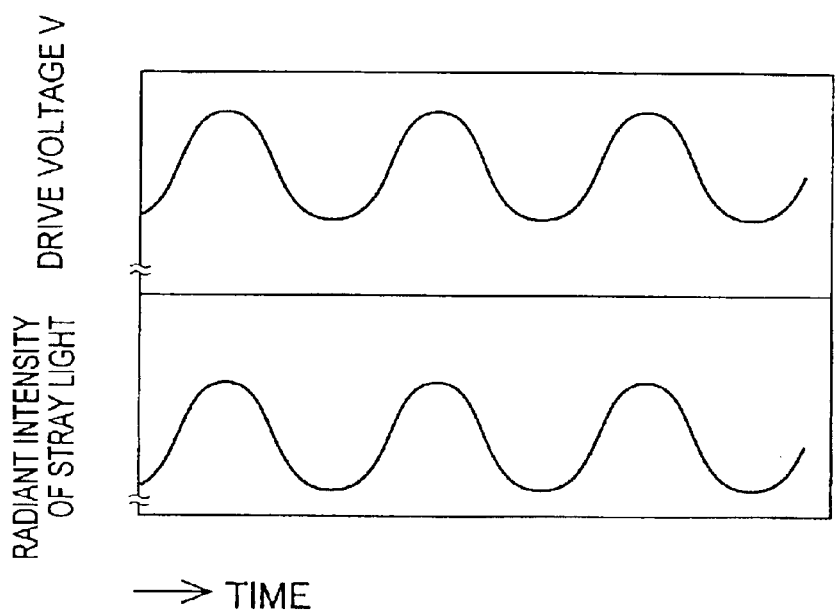
FIG. 5 is a view indicating a relationship between time and voltage V applied to an electric heater of the electric furnace, and a relationship between time and an intensity of a radiant energy of a stray light, when the voltage is controlled to achieve a target value Tm of a temperature in the furnace.
Figure 6:
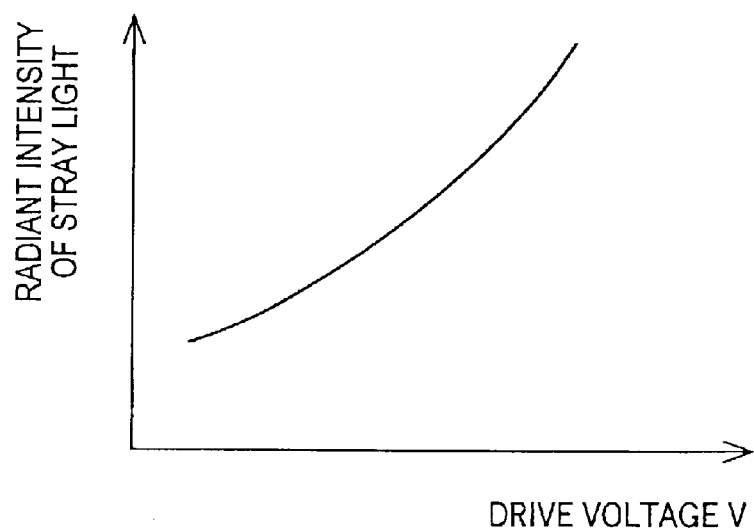
FIG. 6 is a view indicating a relationship between an intensity of the radiant energy of the stray light and the voltage.

To control the inside temperature Tin in the electric furnace 42, the drive voltage V to be applied to the electric heater 46 is changed or oscillated by the temperature adjusting device 50, as shown in FIG. 5, for example. Since an intensity of a noise, that is, an intensity of a radiant energy of a stray light which is emitted from the furnace walls 44 toward the object body 12 and reflected by the surface of the object body 12 changes with the drive voltage V, a relationship between the voltage V and the intensity of the radiant energy of the stray light at an average temperature T inside the furnace 42, as shown in FIG. 6, is experimentally obtained for each of the respective first and second radiations having the respective wavelengths $\lambda_1$ and $\lambda_2$. This relationship is stored in the ROM of the arithmetic control device 40, so that the intensity of the radiant energy of the stray light at each picture element, which is undesirably included in the intensity of the radiant energy detected by the image detector 32 at each picture element as an intensity of the radiant energy emitted from the object body 12, is obtained according to the relationship. The intensity of the radiant energy of the stray light taken along the ordinate of the coordinate system of FIG. 6 is obtained by multiplying an intensity of the radiant energy emitted from the furnace walls 44 and the electric heater 46 by a reflectivity value of the object body 12. In this respect, it is noted that the reflectivity is obtained by subtracting an absorptance value of the object body 12 from 1, when the transmittance of the object body 12 is substantially 0. The drive voltage V periodically oscillated by the temperature adjusting device 50 may be represented by the following equation (1):

$$V = f(\text{Tin}) \sin \omega t \qquad (1)$$

Referring to the flow chart of FIG. 7, there will be described a relevant portion of a control operation of the arithmetic control device 40. The control operation is initiated with step S1 to read the output signals of the multiple photosensitive elements arranged on the light detecting surface 26, for obtaining radiant intensity values $E_{1ij}$ at respective picture elements of the first image $G_1$, and radiant intensity values $E_{2ij}$ at respective picture elements of the second image $G_2$. Then, the control flow goes to step S2 corresponding to a stray-light noise eliminating step or means, to periodically calculate or determine, with a constant calculating cycle time, the intensity of the radiant energy of the stray light adversely affecting each of the first and second radiations, based on an actual value of the drive voltage V applied from the driver circuit 52 to the electric heater 46, and according to the relationship shown in FIG. 6, by way of example, which is stored in the ROM. The cycle time is sufficiently shorter than the oscillating period of the voltage V. For example, the cycle time is several milliseconds. The intensity $\Delta E_{1ij}$, $\Delta E_{2ij}$ of the radiant energy of the stray light thus obtained for each of the first and second radiations is subtracted from the radiant intensity (the intensity of the radiant energy) $E_{1ij}$, $E_{2ij}$ at each picture element in the first and second images $G_1$, $G_2$, as detected in step S1, according to the following equations (2) and (3), for example, so as to rectify or adjust the detected intensity $E_{1ij}$, $E_{2ij}$ of the radiant energy emitted from the object body 12, to obtain a net value $E_{1ijnet}$, $E_{2ijnet}$ of the intensity of the radiant energy originated from the object body 12 only.

$$E_{1ijnet} = E_{1ij} - \Delta E_{1ij} \tag{2}$$

$$E_{2ijnet} = E_{2ij} - \Delta E_{2ij} \tag{3}$$

Figure 8:
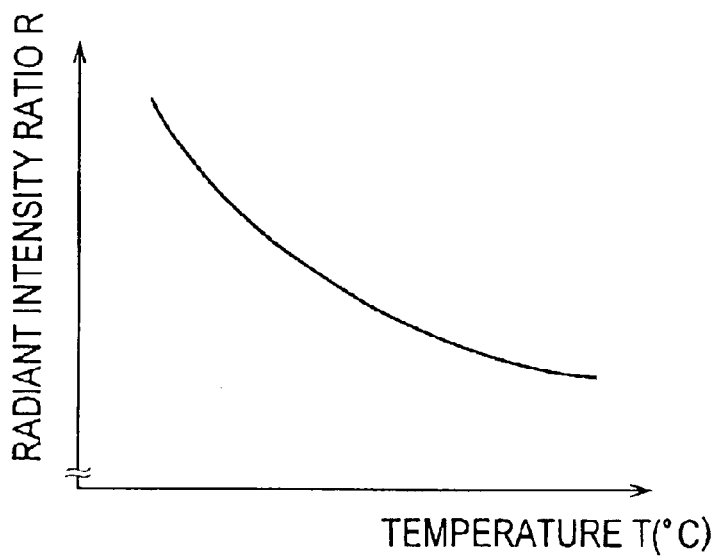
FIG. 8 is a view indicating a relationship used by the arithmetic control device 40 to obtain a surface temperature T from a radiant intensity ratio R in step S4 of the flow chart of FIG. 7.

Then, the control flow goes to step S3 corresponding to a radiant intensity ratio calculating step or means, to calculate a radiant intensity ratio $R_{ij}$ (=$E_{1ijnet}/E_{2ijnet}$ or $E_{2ijnet}/E_{1ijnet}$) at each pair of corresponding picture elements of the first and second images $G_1$ and $G_2$ which are formed at the respective first and second positions $B_1$ and $B_2$ on the light detecting surface 26. The radiant intensity ratio $R_{ij}$ is a ratio of the radiant intensity value $E_{1ijnet}$ of the first wavelength $\lambda_1$ which has been detected by the photosensitive element at each picture element of the first image $G_1$ and from which the intensity $\Delta E_{1ij}$ of the radiant energy of the stray light has been subtracted, to the radiant intensity value $E_{2ijnet}$ of the second wavelength $\lambda_2$ which has been detected by the photosensitive element at the corresponding picture element of the second image $G_2$ and from which the intensity $\Delta E_{2ij}$ of the radiant energy of the stray light has been subtracted. The ratio $R_{ij}$ may be a ratio $E_{2ijnet}/E_{1ijnet}$. Then, step S4 corresponding to a temperature calculating step or means is implemented to calculate a temperature $T_{ij}$ at each picture element of the image of the object body 12, on the basis of the calculated actual radiant intensity ratio $R_{ij}$ at each pair of corresponding picture elements of the first and second images $G_1$, $G_2$, and according to a predetermined relationship between the radiant intensity R and the temperature T as shown in FIG. 8, by way of example. Data representative of the predetermined relationship are stored in the ROM of the arithmetic control device 40. For instance, the relationship as shown in FIG. 8 may be represented by the following equation (4), which is an approximating equation representing the principle of measurement of a dichroic thermometer. The equation (4) is formulated to permit determination of the surface temperature T of the object body 12 on the basis of the ratio R of the radiant intensity values at the respective different wavelengths $\lambda_1$ and $\lambda_2$, without having to use the emissivity of the object body 12. In the following equations, the second wavelength $\lambda_2$ is larger than the first wavelength $\lambda_1$, and "T", "$C_1$" and "$C_2$" respectively represent the absolute temperature, and first and second constants of Planck's law of radiation.

$$R = (\lambda_2/\lambda_1)^5 \exp[(C_2/T) \cdot (1/\lambda_2 - 1/\lambda_1)] \tag{4}$$

The above equation (4) is obtained in the following manner. That is, it is known that an intensity (energy) Eb of a radiation of a wavelength $\lambda$ emitted from a unit surface area of a black body for a unit time, and the wavelength $\lambda$ satisfy the following equation (5), which is the Planck's equation. It is also known that the following equation (6), which is the Wien's approximating equation, is satisfied when exp $(C_2/\lambda T) \gg 1$. For ordinary bodies having gray colors, the following equation (7) is obtained by converting the equation (6) with insertion of the emissivity $\epsilon$. The following equation (8) is obtained from the equation (7), for obtaining the ratio R of the radiant intensity values $E_1$ and $E_2$ of the two wavelength values $\lambda_1$ and $\lambda_2$. Where the two wavelength values $\lambda_1$ and $\lambda_2$ are close to each other, the dependency of the emissivity $\epsilon$ on the wavelength can be ignored, that is, $\epsilon_1 = \epsilon_2$. Thus, the above equation (4) is obtained. Accordingly, the temperatures T of object bodies having different emissivity values $\epsilon$ can be obtained without an influence of the emissivity.

$$Eb = C_1/\lambda^5 [\exp(C_2/\lambda T) - 1] \tag{5}$$

$$Eb = C_1 \exp(-C_2/\lambda T)/\lambda^5 \tag{6}$$

$$E = \epsilon \cdot C_1 \exp(-C_2/\lambda T)/\lambda^5 \tag{7}$$

$$R = (\epsilon_1/\epsilon_2)(\lambda_2/\lambda_1)^5 \exp[(C_2/T) \cdot (1/\lambda_2 - 1/\lambda_1)] \tag{8}$$

Figure 9:
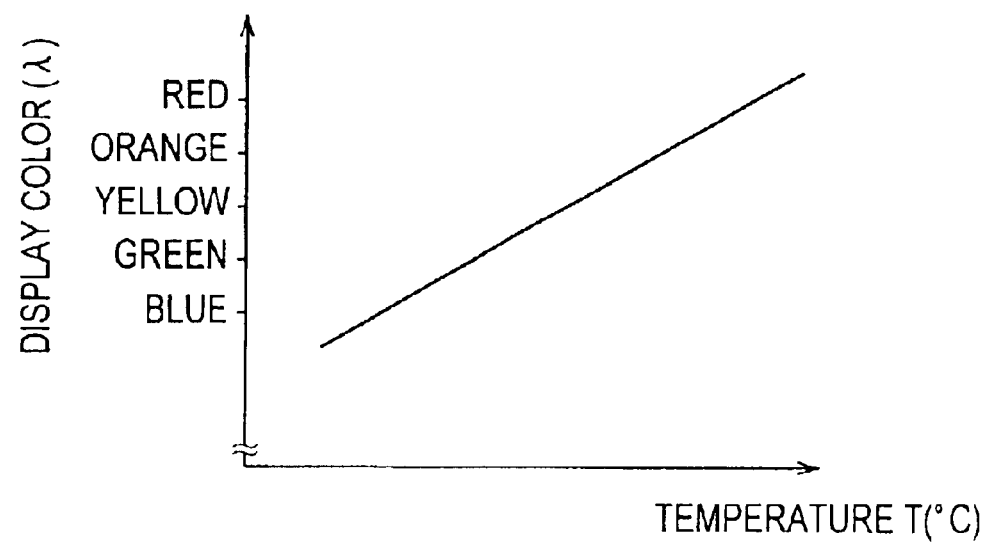
FIG. 9 is a view indicating a relationship used by the arithmetic control device 40 to determine a display color from the surface temperature T in step S5 of the flow chart of FIG. 7.

After the temperature $T_{ij}$ at each picture element of the image of the object body 12 has been calculated in step S4 as described above, the control flow goes to step S5 corresponding to a temperature-distribution displaying step or means, to display a distribution of the surface temperature of the object body 12, on the basis of the actual temperature $T_{ij}$ calculated at each picture element, and according to a predetermined relationship between the temperature T and the display color. Data representative of the predetermined relationship are stored in the ROM of the arithmetic control device 40. FIG. 9 shows one example of the predetermined relationship between the temperature T and the display color. In this case, the distribution of the surface temperature of the object body 12 is shown in predetermined different colors.

There will be described an experimentation conducted by the present inventors, using the optical system shown in FIG. 1 wherein a CCD camera (model ST-7 available from Santa Barbara Instruments Group) comprising a telephoto lens "AF Zoom Nikkor ED 70–300 mm F4–5.6D" available from Nippon Kougaku Kabushiki Kaisha ("Nikon"), Japan, is employed as the image detector 32, and each of the half mirrors 14, 24 is a half mirror of BK7 available from Sigma Koki, Japan, which is provided with a chrome plating for a visible radiation. The half mirror 14, 24 reflects 30% of an incident radiation and transmits 30% of the incident radiation. The mirrors 20, 22 are aluminum plane mirrors of BK7 available from Sigma Koki, Japan. The first filter 34 permits transmission therethrough of a radiation having a wavelength of 600 nm and a half width of 10 nm, while the second filter 36 permits transmission therethrough of a radiation having a wavelength of 650 nm and a half width of 10 nm. The object body 12 used in the experimentation is an alumina substrate (50×50×0.8 mm). This object body 12 was placed in a central part of the electric furnace 42 provided with a window portion for inspecting the inside therethrough, and the temperature of the object body 12 was repeatedly measured according to the steps of the flow chart shown in FIG. 7, while the temperature as detected by the thermometer 48 (thermocouple) was held at 1000° C. In the experimentation, the repeatedly measured temperature of the object body 12 ranged from 995° C. to 1005° C.

A first comparative experimentation was made by using the same optical system and in the same steps as in the experimentation described above, except that the first comparative experimentation employed, in step S2 to remove the stray light noise, an average value of the periodically oscillated-drive voltage V applied to the electric heater 46, for the purpose of determining the radiant intensity values $\Delta E_{1ij}$, $\Delta E_{2ij}$ of the stray light. In this first comparative experimentation, the repeatedly measured temperature of the object body 12 ranged from 992° C. to 1008° C. Further, a second comparative experimentation was made by the same optical system and according to the same steps as in the experimentation using the apparatus of the first embodiment, except that the step S2 of removing the stray light noise in the flow chart shown in FIG. 7 was not implemented in the second comparative experimentation. In this second comparative experimentation, the repeatedly measured temperature of the object body 12 ranged from 1005° C. to 1025° C.

As described above, the present first embodiment is arranged to first calculate the intensity values $\Delta E_{1ij}$, $\Delta E_{2ij}$ of the radiant energy of the stray light, which is emitted from the inner wall surfaces of the electric furnace 42 toward the object body 12 and reflected by the surface of the object body 12, at each picture element and with regard to each of the first and second radiations having the respective first and second wavelengths $\lambda_1$ and $\lambda_2$, based on the voltage V applied to the electric heater 46 of the electric furnace 42, and according to the stored relationship shown in FIG. 6, by way of example. Then, the temperature $T_{ij}$ of the object body 12 is calculated at each picture element of its image, on the basis of the radiant intensity ratio $R_{ij}$, which is a ratio of the actual intensity $E_{1ijnet}$ of the radiant energy of the first radiation, obtained by subtracting the intensity $\Delta E_{1ij}$ of the radiant energy of the stray light (adversely affecting the first radiation) from the intensity $E_{1ij}$ of the radiant energy actually detected as an intensity of the radiant energy of the first radiation (selected from the light emitted from the object body 12), to the actual intensity $E_{2ijnet}$ of the radiant energy of the second radiation, obtained by subtracting the intensity $\Delta E_{2ij}$ of the radiant energy of the stray light (adversely affecting the second radiation) from the intensity $E_{2ij}$ of the radiant energy actually detected as an intensity of the radiant energy of the second radiation (selected from the light emitted from the object body 12). Thus, the present measuring apparatus permits highly accurate measurement of the surface temperature of the object body 12 in the electric furnace 42.

Further, the present embodiment is arranged such that the radiant intensity values $\Delta E_{1ij}$, $\Delta E_{2ij}$ of the stray light included in the respective first and second radiations are periodically obtained with a cycle time sufficiently shorter than the cycle time of oscillation of the voltage V, and the radiant intensity values $\Delta E_{1ij}$, $\Delta E_{2ij}$ are eliminated from the detected radiant intensity values $E_{1ij}$, $E_{2ij}$ of the first and second radiations, respectively, so as to obtain true values of radiant intensity values $E_{1ijnet}$, $E_{2ijnet}$ of the first and second radiations. The surface temperature of the object body 12 in the electric furnace 42 is obtained based on the thus obtained true values $E_{1ijnet}$, $E_{2ijnet}$ of the intensities of the radiant energies of the first and second radiations. Thus, the accuracy of the measurement is further enhanced.

As described above, the present embodiment is arranged to calculate the temperature $T_{ij}$ of the object body 12 at each picture element of its image, on the basis of the radiant intensity ratio $R_{ij}$ at each pair of corresponding picture elements of the first and second images $G_1$ and $G_2$ obtained with the respective first and second radiations having the first and second wavelengths $\lambda_1$ and $\lambda_2$ selected from the light emitted from the surface of the object body 12. To select the first radiation having the first wavelength $\lambda_1$ from the light emitted from the surface of the object body 12, the optical system of the present embodiment uses the first filter 34 which permits transmission therethrough of the radiation having the first wavelength $\lambda_1$ which is selected according to the radiant-intensity curve L1 corresponding to the wavelength of the black body at the substantially lower limit of the range of the temperature to be measured, and which is within a high radiant-intensity range in which the radiant intensity is higher than the background radiant intensity EBG at a normal room temperature. The optical system further uses the second filter 36 which permits transmission therethrough of the second radiation having the second wavelength $\lambda_2$ which is selected within the above-indicated high radiant-intensity range, such that the second wavelength $\lambda_2$ is different from the first wavelength $\lambda_1$ by a predetermined difference which is not larger than $1/12$ of the first wavelength $\lambda_1$ and which is not smaller than a sum of a half width $\Delta\lambda_1$ of the first wavelength $\lambda_1$ and a half width $\Delta\lambda_2$ of the second wavelength $\lambda_2$. Accordingly, optical signals having sufficiently high radiation intensities can be obtained, leading to an accordingly high S/N ratio of the image detector 32. In addition, the first and second wavelengths $\lambda_1$ and $\lambda_2$ are close to each other, so that the principle of measurement of the present optical system fully matches the principle of measurement of a dichroic thermometer, namely, fully meets a prerequisite that the dependency of the emissivity on the wavelength can be ignored for two radiations the wavelengths of which are close to each other, leading to approximation $\epsilon_1 = \epsilon_2$. Thus, the present measuring apparatus permits highly accurate measurement of the temperature distribution.

Further, the present embodiment is arranged such that the first filter 34 permits transmission therethrough of the radiation having the half width $\Delta\lambda_1$ which is not larger than $1/20$ of the first wavelength $\lambda_1$, while the second filter 36 permits transmission therethrough of the radiation having the half width $\Delta\lambda_2$ which is not larger than $1/20$ of the second wavelength $\lambda_2$, so that the radiations having these first and second wavelengths $\lambda_1$ and $\lambda_2$ are considered to exhibit a sufficiently high degree of monochromatism. Accordingly, the present embodiment meets the prerequisite for the principle of measurement by a dichroic thermometer, resulting in an improved accuracy of measurement of the temperature distribution.

In addition, the present embodiment is arranged such that the first and second filters 34, 36 have transmittance values whose difference is not higher than 30%, so that the present optical system has high sensitivity and S/N ratio, even for one of the two radiations of the first and second wavelengths $\lambda_1$, $\lambda_2$ which has a lower luminance value, permitting accurate measurement of the temperature distribution.

While the first preferred embodiment of the present invention has been described in detail by reference to FIGS. 1–9, it is to be understood that the present first embodiment may be modified.

Figure 7:
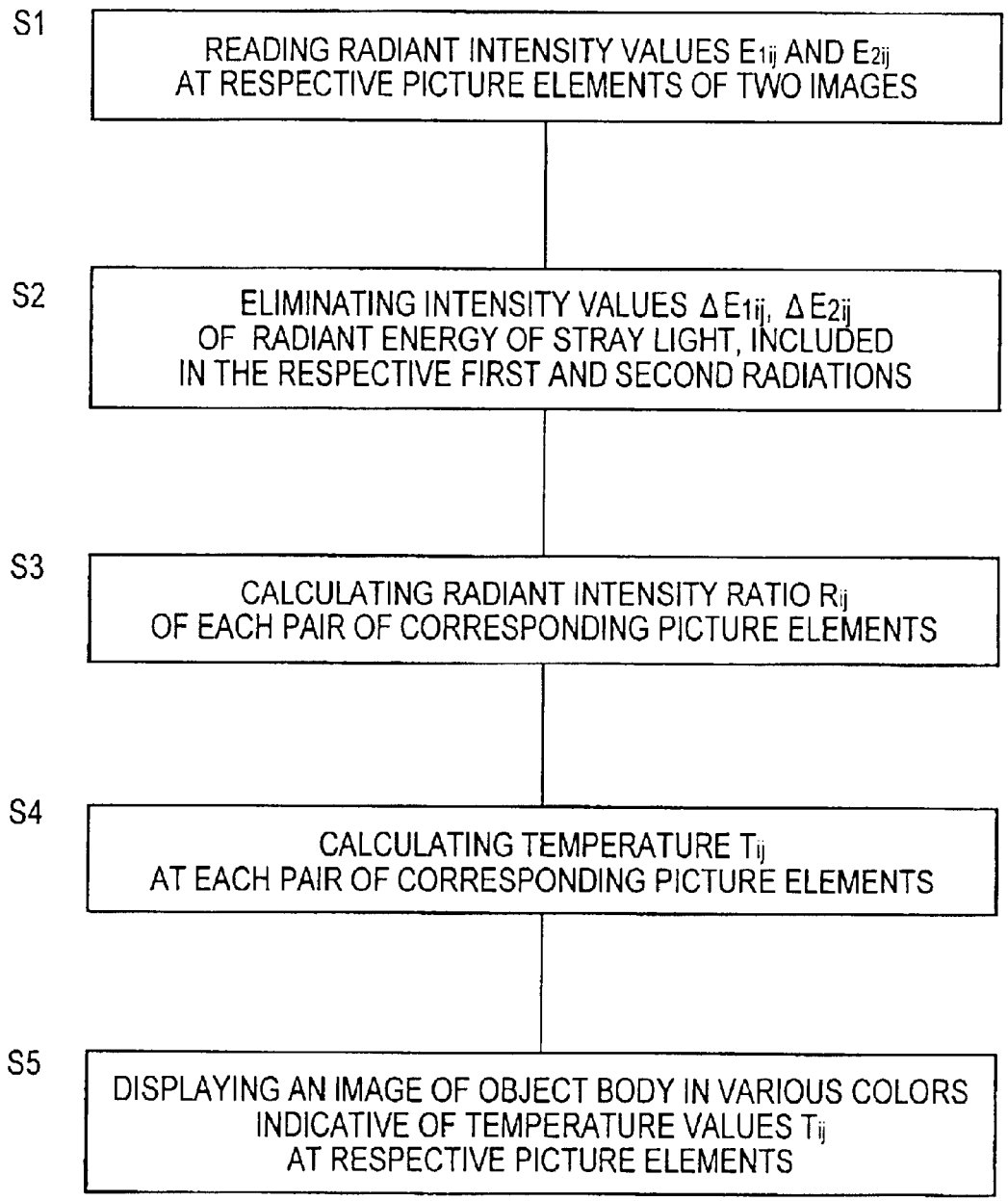
FIG. 7 is a flow chart for explaining a relevant part of a control operation performed by an arithmetic control device 40 shown in FIG. 1.

In step S2 of flow chart of FIG. 7 in the first embodiment, the intensity values $\Delta E_{1ij}$, $\Delta E_{2ij}$ of the radiant energies of the stray light are periodically calculated based on the drive voltage V, with a cycle time sufficiently shorter than the cycle time of oscillation of the voltage V applied to the electric heater 42. However, the intensity values $\Delta E_{1ij}$, $\Delta E_{2ij}$ may be calculated based on a moving average of the oscillated voltage V.

In the first embodiment, the thermometer 48 for detecting the temperature inside the electric furnace 42 is a thermocouple. However, the thermometer may be any other temperature sensors such as an optical pyrometer.

Figure 10:
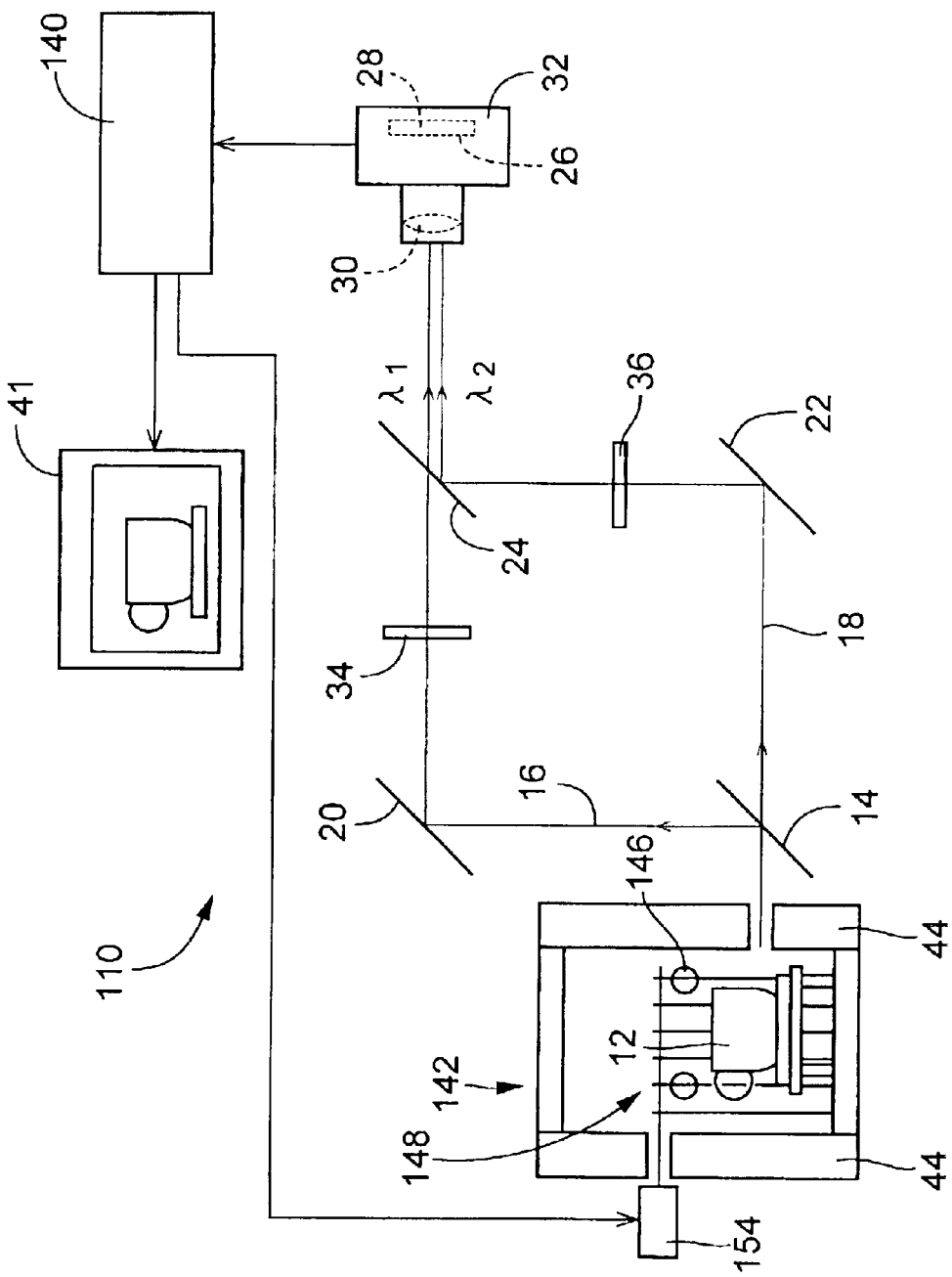
FIG. 10 is a view corresponding to that of FIG. 1, illustrating an arrangement of a temperature-distribution measuring apparatus according to a second embodiment of this invention.

There will next be described in detail a second embodiment of the present invention, in the form of a temperature-distribution measuring apparatus 110, which is constructed as schematically shown in FIG. 10. Many elements of the apparatus 110 are similar to the corresponding elements of the apparatus 10 according to the first embodiment. Therefore, the similar elements will be denoted with the same reference numerals and description thereof is omitted, and only the elements specific to the apparatus 110 will be described in detail. An optical system including mirrors 14, 24, 20, 22, an image detector 32 and a first and a second filter 34, 36 are similar to those of the first embodiment. However, in the apparatus 110 according to the second embodiment, an object body 12 is located and heated in a heating furnace 142, which is different in construction from the electric furnace 42 of the apparatus 10. The heating furnace 142 will be described later.

An arithmetic control device 140 is a micro-computer incorporating a central processing unit (CPU), a random-access memory (RAM), a read-only memory (ROM) and an input-output interface, similarly to the arithmetic control device 40 in the first embodiment. However, the manner in which the arithmetic control device 140 operates to calculate the surface temperature of the object body 12, or to remove the stray light noise from the detected intensity of the radiant energy of the light emitted from the object body 12, is different from that of the first embodiment. This different manner will be described later. The apparatus 110 of FIG. 10 uses the same image display device 41 as used in the first embodiment, and the description thereof is omitted.

Figure 11A:
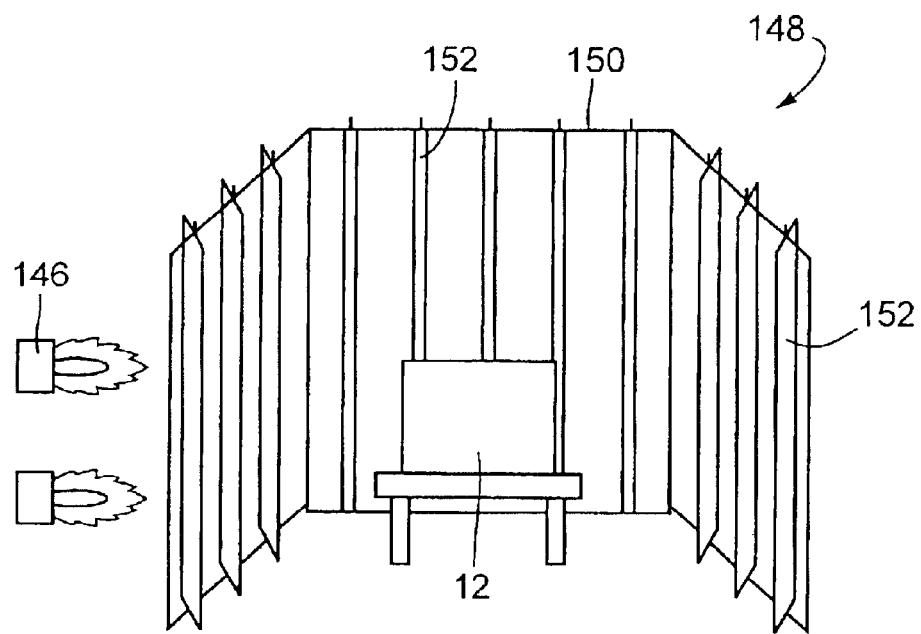
FIGS. 11A and 11B are fragmentary views schematically illustrating an arrangement of a shielding device 148 of the apparatus of FIG. 1, FIG. 11A showing the shielding device in an open state while FIG. 11B showing the shielding device in a closed state.
Figure 11B:
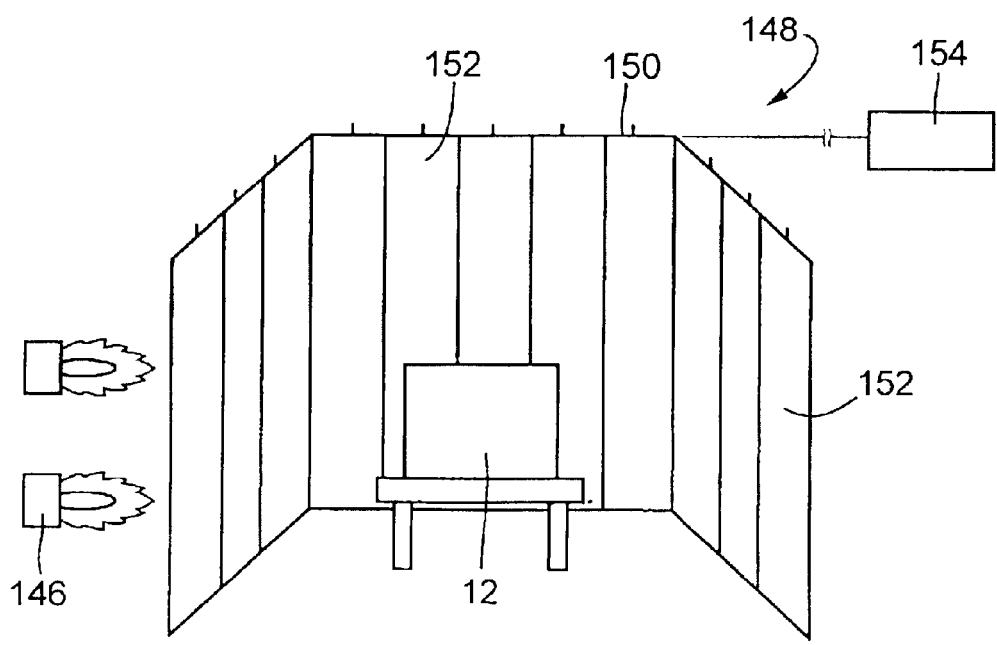
Figure 12A:
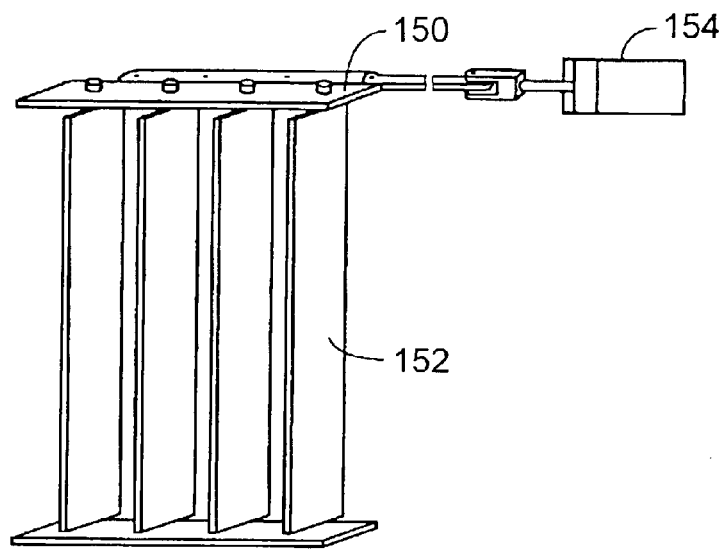
FIGS. 12A and 12B are fragmentary views schematically illustrating an arrangement of the shielding device 148, FIG. 12A showing the shielding device in the open state while FIG. 12B showing the shielding device in the closed state.
Figure 12B:
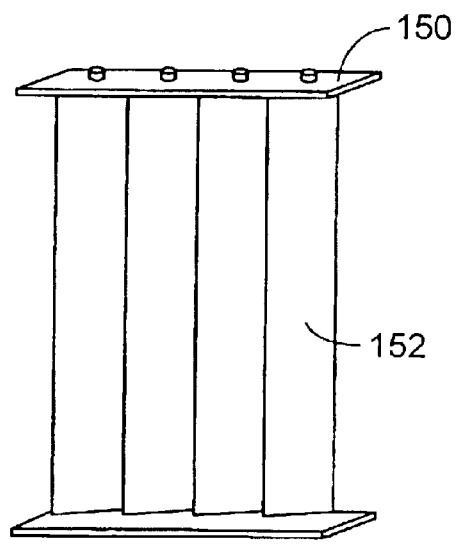

Referring next to FIG. 11, the heating furnace 142 has the furnace walls 44 as in the first embodiment and is provided with burners 146 disposed in the side furnace wall 44, and a shielding device 148 which is disposed between the burners 146 and the object body 12 and operable between its open state and closed state. As shown in enlargement in the fragmentary view of FIG. 12, the shielding device 148 comprises a frame 150, a plurality of shielding plates 152 each of which is pivotably supported by the frame 150, and a drive device 154 for driving or pivoting the plurality of shielding plates 152 to their open state or closed state. FIG. 11A and FIG. 12A show the shielding device 148 placed in the open state, while FIG. 11B and FIG. 12B show the shielding device 148 placed in the closed state. The outer surface (on the side of the heat source, i.e., the burners 146) of each shielding plate 152 is provided with a coating or a thin film of a material having a relatively high value of reflectivity, such as platinum or silver, while the inner surface (on the side of the object body 12) is provided with a black coating having a relatively high value of emissivity, so that the shielding plates 152 in the closed state reflect or absorb the noise or stray radiations which are emitted from the burners 146 (heat source) and side furnace walls 44 and which have respective intensities. Accordingly, the stray radiations emitted from the burners 146 and side furnace walls 44 and reaching the object body 12 are evenly distributed around the object body 12 in the presence of the shielding plates 152 in the paths of traveling of the stray radiations. In other words, a local variation in the radiant intensity of the stray light is presented by the shielding plates 152 in its closed state. It is noted that above-described coating having relatively high reflectivity or high emissivity may be provided on both surfaces of the shielding plates 152.

Referring to the flow chart of FIG. 13, there will be described a relevant portion of a control operation of the arithmetic control device 140. The control operation is initiated with step S11 corresponding to a light shielding step or means, in which the shielding device 148 which has been held in its open state (as shown in FIG. 11A and FIG. 12A) during heating of the object body 12 in the heating furnace 142 in a heating step is brought into its closed state (as shown in FIG. 11B and FIG. 12B). According to this arrangement, the intensities of the radiations emitted from the side furnace walls 44 and the burners 146 toward the object body 12 are made uniform. The step S11 is followed by step S12 corresponding to a radiant-energy detecting step or means and to the step S1 of the flow chart of FIG. 7, in which the output signals of the multiple photosensitive elements arranged on the light detecting surface 26 are read for obtaining radiant intensity values $E_{1ij}$ at respective picture elements of the first image $G_1$, and radiant intensity values $E_{2ij}$ at respective picture elements of the second image $G_2$, while the shielding device 148 is held in its closed state.

Then, the control flow goes to step S13 corresponding to a stray-light noise eliminating step or means and to the step S2 of the flow chart of FIG. 7, to first obtain the intensity $\Delta E_{1ij}$, $\Delta E_{2ij}$ of the radiant energy of the stray light for each of the first and second radiation, based on a temperature of the shielding device 148 and according to a predetermined relationship between the temperature of the shielding device 148 and the intensity of the radiant energy of the stray light, and to subtract the intensity $\Delta E_{1ij}$, $\Delta E_{2ij}$ of the radiant energy of the stray light from the radiant intensity $E_{1ij}$, $E_{2ij}$ at the corresponding picture element in the first and second image $G_1$, $G_2$, as detected in step S12, according to the above equations (2), (3), so as to eliminate the noise or the intensity of the radiant energy of the stray light to obtain a net value $E_{1ijnet}$, $E_{2ijnet}$ of the intensity of the radiant energy originated from the object body 12 only, at each picture element in the first and second image $G_1$, $G_2$. Described more specifically, the intensity $\Delta E_{1ij}$, $\Delta E_{2ij}$ of the radiant energy of the stray light, which is included in the detected intensity of the radiant energy of the first and second radiation which is emitted from the shielding device 148 held in its closed state toward the object body 12 and then reflected by the surface of the object body 12, is eliminated from the detected radiant intensity $E_{1ij}$, $E_{2ij}$. The predetermined relationship between the temperature of the shielding device 148 and the intensity $\Delta E_{1ij}$, $\Delta E_{2ij}$ of the radiant energy of the stray light is obtained by actually measuring the intensity of the radiant energy at each temperature of the shielding device 148 in its closed state, and multiplying the intensity of the radiant energy of the stray light by the reflectivity of the object body 12. In this respect, it is noted that the reflectivity is obtained by subtracting the emissivity or absorptance of the object body 12 from 1, when the transmittivity of the object body 12 is substantially 0. Data representative of the predetermined relationship are stored in the ROM of the arithmetic control device 140.

Then, the flow chart goes to step S14 corresponding to a radiant intensity ratio calculating step or means and to the step S3 of the flow chart of FIG. 7, to calculate a radiant intensity ratio $R_{ij}$ ($=E_{1ijnet}/E_{2ijnet}$, or $E_{2ijnet}/E_{1ijnet}$) at each pair of corresponding picture elements of the first and second images $G_1$ and $G_2$, in the same manner as in the step S3. Then, step S15 corresponding to a temperature calculating step or means and to the step S4 in the flow chart of FIG. 7, is implemented to calculate a temperature $T_{ij}$, in the same manner as in the step S4.

After the temperature $T_{ij}$ at each picture element of the image of the object body 12 has been calculated in step S15 as described above, the control flow goes to step S16 corresponding to a temperature distribution displaying step or means and to the step S5 in the flow chart of FIG. 7, to display a distribution of the surface temperature of the object body 12, in the same manner as in step S5.

There will be described an experimentation conducted by the present inventors, using the optical system shown in FIG. 10 wherein a CCD camera (model ST-7 available from Santa Barbara Instruments Group) comprising a telephoto lens "AF Zoom Nikkor ED 70–300 mm F4–5.6D" available from Nippon Kougaku Kabushiki Kaisha ("Nikon"), Japan, is employed as the image detector 32, and each of the half mirrors 14, 24 is a half mirror of BK7 available from Sigma Koki, Japan, which is provided with a chrome plating for a visible radiation. The half mirror 14, 24 reflects 30% of an incident radiation and transmits 30% of the incident radiation. The mirrors 20, 22 are aluminum plane mirrors of BK7 available from Sigma Koki, Japan. The first filter 34 permits transmission therethrough of a radiation having a wavelength of 600 nm and a half width of 10 nm, while the second filter 36 permits transmission therethrough of a radiation having a wavelength of 650 nm and a half width of 10 nm. The object body 12 used in the experimentation is an alumina substrate (50×50×0.8 mm). This object body 12 was placed in a central part of the heating furnace 142 provided with a window portion for inspecting the inside of the furnace 142 therethrough and having an electric heater, in place of the burners 146, and the temperature within the furnace was raised from the room temperature up to 1000° C. at a rate of 10° C./min and held at 1000° C. for one hour. Then, the temperature of the object body 12 was repeatedly measured according to the steps of the flow chart shown in FIG. 13, while the temperature in the heating furnace 142 which was detected by the thermometer 48 (thermocouple) was held at 1000° C. In the experimentation, the repeatedly measured temperature of the object body 12 ranged from 995° C. to 1005° C.

A first comparative experimentation was made by using the same optical system and in the same steps as in the experimentation described just above, except that the step S13 of removing the stray light noise was not implemented in the first comparative experimentation. In this first comparative experimentation, the repeatedly measured temperature of the object body 12 ranged from 1005° C. to 1015° C. Further, a second comparative experimentation was made by using the same optical system and in the same steps as in the experimentation described above, except that the shielding device 148 was not provided and that the step S13 was not implemented in the second comparative experimentation. In the second comparative experimentation, the repeatedly measured temperature of the object body 12 ranged from 1005° C. to 1025° C.

As described above, the second embodiment of the present invention is arranged such that: the object body 12 is heated in the heating step, while the shielding device disposed between the side furnace walls 44 of the heating furnace 142 and the object body 12 is in its open state; the intensity of the radiant energy emitted from the object body 12 is detected in step S12 corresponding to the radiant-energy detecting step or means, while the shielding device 148 is closed; and the temperature at each picture element of the image of the object body 12 is calculated in the step S15 corresponding to the temperature calculating step or means, based on the intensity of the radiant energy emitted from the object body 12 as detected in the step S12. Accordingly, the stray light noise or the intensity of the radiant energy of the stray light, which is emitted from the side furnace walls 44 and the burners 146 toward the object body 12 and reflected by the surface of the object body 12 and which is included in the intensity of the radiant energy detected as the intensity of the radiant energy emitted from the object body 12, is evenly distributed by the shielding device 148. The even distribution of the radiant intensity of the stray light is obtained according to the predetermined relationship and is easily eliminated from the detected intensity of the radiant energy emitted from the object body 12. Thus, the surface temperature of the object body 12 in the heating furnace 142 can be measured with high accuracy.

In addition, according to the present second embodiment, the radiant energy emitted from the inner wall surface of the heating furnace 142 and having a locally uneven intensity is cut or shut off by the shielding device 148, which radiates a radiant energy having an even intensity toward the object body 12. Based on the temperature of the shielding device 148, the intensity $\Delta E_{1ij}$, $\Delta E_{2ij}$ of the radiant energy of the stray light which is emitted toward the object body 12 and reflected by the surface of the object body 12 is obtained. Then, the temperature of the object body 12 at each pair of the corresponding picture elements is calculated based on the intensity $E_{1ijnet}$, $E_{2ijnet}$ which is obtained by subtracting the intensity $\Delta E_{1ij}$, $\Delta E_{2ij}$ of the radiant energy of the stray light from the intensity $E_{1ij}$, $E_{2ij}$ detected at each pair of corresponding picture elements as the intensity of the radiant energy emitted form the object body 12. Thus, the surface temperature of the object body 12 can be measured with high accuracy.

Further, according to the second embodiment, the intensity values $\Delta E_{1ij}$, $\Delta E_{2ij}$ are periodically calculated with a predetermined constant cycle time, and are eliminated from the intensity $E_{1ij}$, $E_{2ij}$ actually detected as the intensity of the radiant energy emitted from the object body 12, to obtain the intensity $E_{1ijnet}$, $E_{2ijnet}$ based on which the surface temperature of the object body 12 in the heating furnace 142 is iteratively determined. Thus, the accuracy of the measurement is further improved.

The present second embodiment also exhibits some of the advantages of the first embodiment.

It is to be understood that the illustrated embodiments of FIGS. 1–13 may be modified. Several examples of such modifications will be described.

In the illustrated embodiments, the apparatus 10, 110 utilizes the principle of a dichroic thermometer, according to which two radiations having respective different wavelengths are selected from the light emitted from the object body 12. However, a temperature-distribution measuring apparatus utilizing the principle of a monochromatic thermometer or the principle of a polychroic thermometer may be employed. In the last case, three or more radiations having respective wavelengths are selected from the light emitted from the object body 12.

It is noted that the inspection opening of the electric furnace 42 and the heating furnace 142, through which the radiant intensity emitted from the object body 12 in the furnace 42, 142 is detected, may be provided in any furnace wall, i.e., in any one of the top, bottom and side walls of the furnace.

Figure 14:
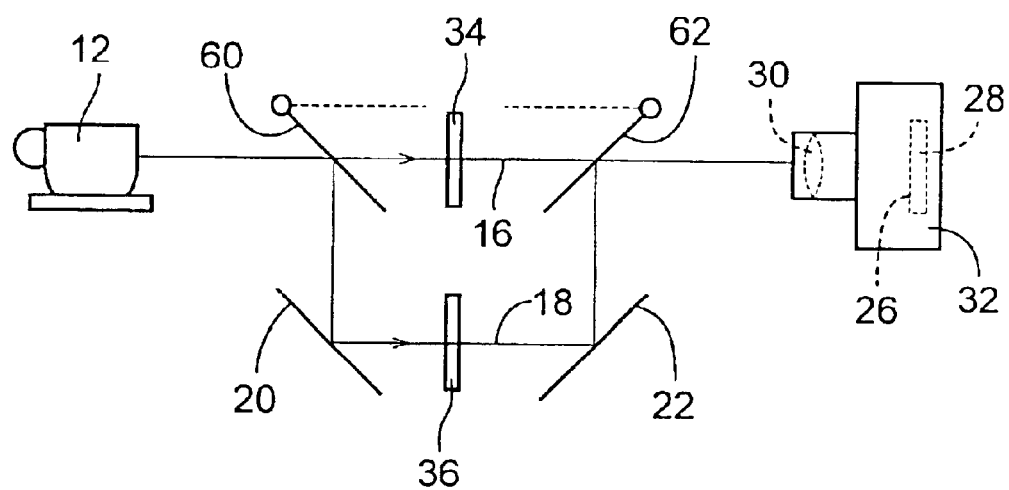
FIG. 14 is a view corresponding to FIGS. 1 and 10, illustrating another optical system of a temperature-distribution measuring apparatus according to a third embodiment.
Figure 15:
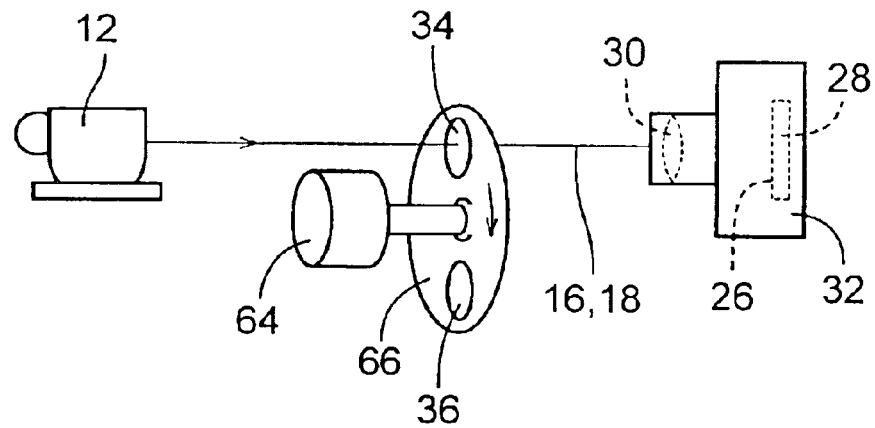
FIG. 15 is a view corresponding to FIGS. 1 and 10, illustrating an optical system according to a fourth embodiment.
Figure 16:
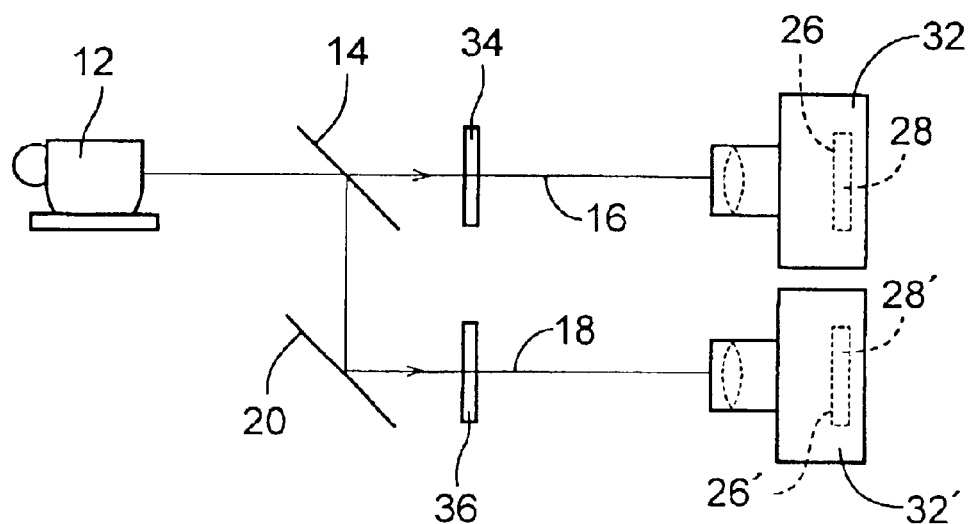
FIG. 16 is a view corresponding to FIGS. 1 and 10, illustrating an optical system according to a sixth embodiment.

In place of the optical system employed in the illustrated embodiments, any one of optical systems shown in FIGS. 14, 15 and 16 may be employed. The optical systems will be described.

In FIG. 14, there is schematically illustrated optical system suitable for embodying the present invention. In FIG. 14, a pair of mirrors 60, 62 are disposed such that each of these mirrors 60, 62 is pivotable about its fixed end between a first position indicated by broken line and a second position indicated by solid line. When the mirrors 60, 62 are placed in the first position, a light emitted from the surface of the object body 12 is incident upon the image detector 32 along the first optical path 16. When the mirrors 60, 62 are placed in the second position, the light is incident upon the image detector 32 along the second optical path 18. As in the preceding embodiments, the first optical path 16 is provided with the first filter 34, while the second optical path 18 is provided with the second filter 36, so that the first and second images $G_1$ and $G_2$ are formed by the respective two radiations having the respective first and second wavelengths $\lambda_1$ and $\lambda_2$, with a predetermined time difference.

In still another optical system shown in FIG. 15, a rotary disc 66 is disposed such that the rotary disc 66 is rotatable by an electric motor 64, about an axis which is parallel to an optical path extending between the object body 12 and the image detector 32 and which is offset from the optical path in a radial direction of the rotary disc 66, by a suitable distance. The rotary disc 66 carries the first filter 34 and the second filter 36 such that these first and second filters 34, 36 are selectively aligned with the optical path by rotation of the rotary disc 66 by the electric motor 64. The first image $G_1$ is formed with the radiation which has the first wavelength $\lambda_1$ and which has been transmitted through the first filter 34, and the second image $G_2$ is formed with the radiation which has the second wavelength $\lambda_2$ and which has been transmitted through the second filter 36. These first and second images $G_1$ and $G_2$ are successively obtained by rotating the rotary disc 66.

In a further another optical system shown in FIG. 16, the light emitted from the surface of the object body 12 is split by the half mirror 14 into a first component traveling along the first optical path 16 and a second component traveling along the second optical path 18. The first optical path 16 is provided with the image detector 32. On the other hand, the second optical path 16 is provided with another image detector 32'. The first and second filters 34, 36 may be disposed in the image detector 32, 32', respectively. In the present embodiment, too, the first image $G_1$ is formed with the radiation having the first wavelength $\lambda_1$ which is selected from the light emitted from the surface of the object body 12, as a result of transmission of the light through the first filter 34, and at the same time the second image $G_2$ is formed with the radiation having the second wavelength $\lambda_2$ which is selected from the light from the object body 12 as a result of transmission of the light through the second filter 36.

In the illustrated embodiments, the first and second wavelengths $\lambda_1$ and $\lambda_2$ are selected according to the radiant-intensity curve L1 of FIG. 2 corresponding to the wavelength of the black body at the lower limit of the range of the temperature to be measured, and which is within a high radiant-intensity range in which the radiant intensity is at least three times the background radiant intensity EBG at a normal room temperature. However, the radiant intensity need not be at least three times the background radiant intensity EBG, since the principle of the present invention is satisfied as long as the radiant intensity is sufficiently higher than the background radiant intensity EBG at the normal room temperature.

In the illustrated embodiments, the half width $\Delta\lambda_1$ of the first wavelength $\lambda_1$ is equal to or smaller than $\frac{1}{20}$ of the first wavelength $\lambda_1$, and the half width $\Delta\lambda_2$ of the second wavelength $\lambda_2$ is equal to or smaller than $\frac{1}{20}$ of the second wavelength $\lambda_2$. However, the half widths need not be equal to or smaller than $\frac{1}{20}$ of the wavelength values, but may be slightly larger than $\frac{1}{20}$ of the wavelength values, according to the principle of the invention.

In the illustrated embodiments, a difference of the transmittance values of the first and second filters 34, 36 is equal to or smaller than 30%. However, the difference need not be equal to or smaller than 30%, but may be slightly larger than 30%, according to the principle of the invention.

Figure 13:
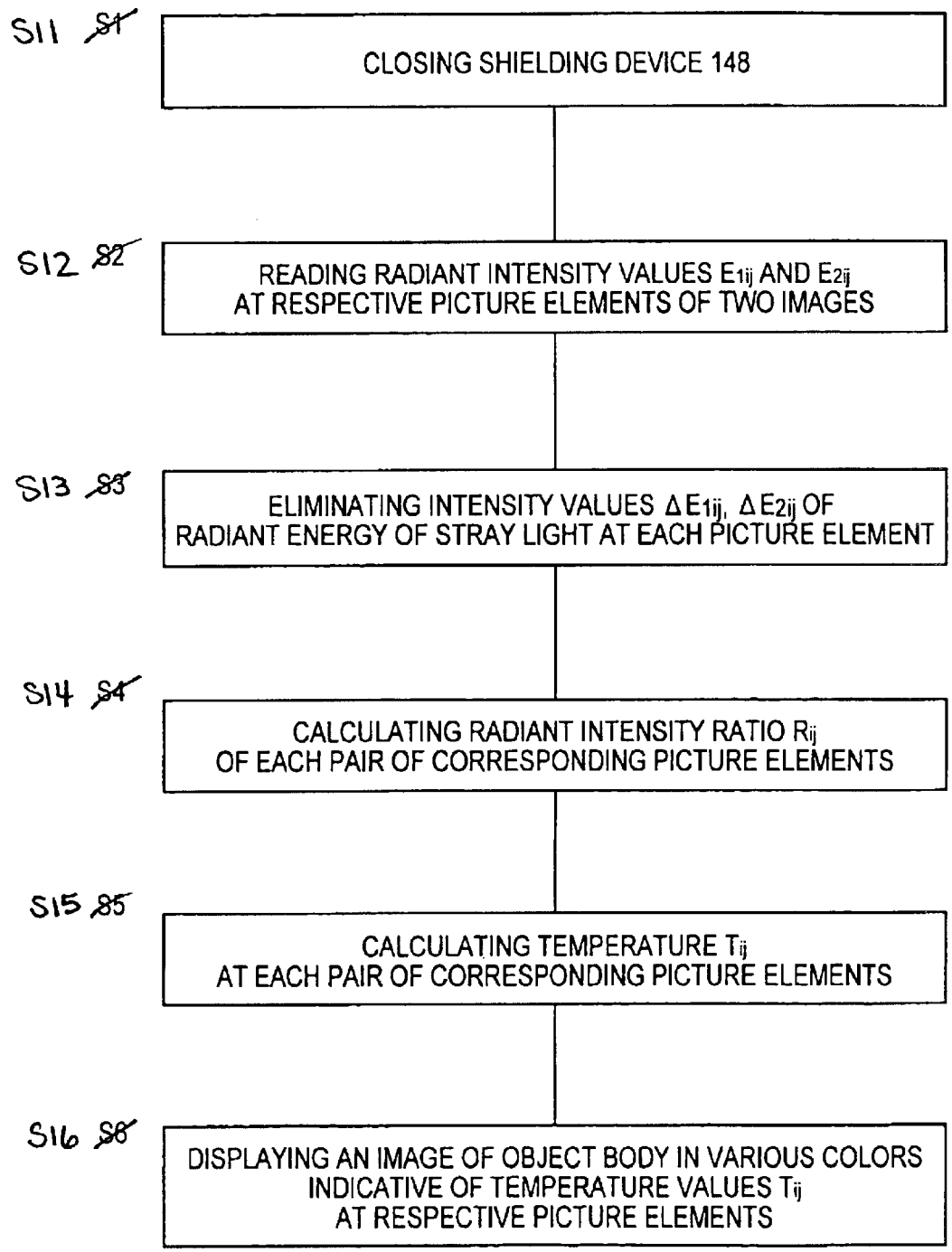
FIG. 13 is a flow chart for explaining a relevant part of a control operation performed by an arithmetic control device 140 shown in FIG. 10.

Although the surface temperature of the object body 12 is indicated in different colors in step S5 of FIG. 7 and in step S6 of FIG. 13, the surface temperature may be indicated in any other fashion, for example, by contour lines or in different density values.

While the image detector 32, 32' used in the illustrated embodiments uses the CCD device 28 having the light detecting surface 26, the image detector may use any other light sensitive element such as a color imaging tube.

In the illustrated embodiments, the picture elements correspond to the respective photosensitive elements. However, a plurality of photosensitive elements adjacent to each other may correspond to one picture element of the images $G_1$, $G_2$, or the image displayed by the display device 41.

It is noted that the relationship shown in FIG. 8 is used in the case where the radiant intensity ratio $R_{ij}$ is a ratio of the intensity $E_{1ijnet}$ of the radiant energy of the first radiation to the intensity $E_{2ijnet}$ of the radiant energy of the second radiation. In a case where the radiant intensity ratio $R_{ij}$ is a ratio of the intensity $E_{2ijnet}$ of the radiant energy of the second radiation to the intensity $E_{1ijnet}$ of the radiant energy of the first radiation, the direction of the slope of the graph is reversed.

It is to be understood that the present invention may be embodied with various other changes, modifications and improvements, which may occur to those skilled in the art, in the light of the technical teachings of the present invention which have been described.

What is claimed is:

1. A method of measuring a temperature of an object body in a heating furnace, based on an intensity value of a radiant energy of a light emitted from the object body, the method comprising:

a heating step of heating the object body while a shielding device, which is disposed between the object body and an inner wall surface of the heating furnace and operable between an open state for permitting a stray light to be emitted from an inner wall surface of said heating furnace and a closed state for inhibiting the stray light from reaching the object body, is held in said open state;

a radiant-energy detecting step of detecting said intensity value of a radiant energy of said light emitted from the object body while the shielding device is held in said closed state;

a stray-light noise eliminating step of eliminating an intensity value of a radiant energy of said stray light from said intensity value of a radiant energy of said light emitted from the object body based on a temperature of said shielding device; and a temperature calculating step of calculating a temperature of the object body based on the intensity value of the radiant energy of said light emitted from the object body detected in said radiant-energy detecting step after said intensity value of a radiant energy of said stray light has been eliminated.

2. A method according to claim 1, wherein said light emitted from the surface of said object body is separated into first and second radiations having respective first and second wavelengths, which form respective first and second images having respective picture elements on a multiplicity of photosensitive elements;

said radiant-energy detecting step comprises:
   a first-wavelength radiant-energy detecting step of detecting a radiant intensity value of said first radiation at each of the picture elements of said first image while the shielding device is held in said closed state, wherein said first radiation is selected by using a first filter that permits transmission therethrough of said first radiation having said first wavelength, and according to a radiant intensity curve corresponding to a wavelength of a black body at a lower limit of a range of the temperature to be measured, and which is within a high radiant intensity range in which the radiant intensity is higher than a radiant intensity at a normal room temperature, said first filter permitting transmission therethrough of a radiation having a half width which is not larger than 1/20 of said first wavelength; and
   a second-wavelength radiant-energy detecting step of detecting a radiant intensity value of said second radiation at each of the picture elements of said second image while the shielding device is held in said closed state, wherein said second radiation is selected by using a second filter which permits transmission therethrough of said second radiation having said second wavelength, and is within a radiant intensity range such that said second wavelength is different from said first wavelength by a predetermined difference which is not larger than 1/12 of said first wavelength, and which is not smaller than a sum of a half width of said second wavelength;

said stray-light noise eliminating step eliminates the intensity values of radiant energy of said stray light having respective said first and second wavelengths from said intensity values of said first and second radiation at each of the picture elements of respective first and second images based on a temperature of said shielding device;

said temperature calculating step comprises obtaining, at each pair of corresponding picture elements of said first and second images, a ratio of the intensity value of the radiant energy of the first radiation detected in the first-wavelength radiant energy detecting step to the intensity value of the radiant energy of the second radiation detected in the second-wavelength radiant-energy detecting step after said intensity values of radiant energy of said stray light have been eliminated; and calculating the temperature at each pair of picture elements based on the obtained ratios;

wherein a distribution of a surface temperature of said object body in said heating furnace is displayed based on the calculated temperatures.

3. A method according to claim 2, wherein said first filter permits transmission therethrough of a radiation having a half width which is not larger than 1/20 of said first wavelength, while said second filter permits transmission therethrough of a radiation having a half width which is not larger than 1/20 of said second wavelength.

4. A method according to claim 2, wherein said first and second filters have transmittance values whose difference is not higher than 30%.

5. An apparatus for measuring a temperature of an object body in a heating furnace, based on an intensity value of a radiant energy of a light emitted from the object body, the apparatus comprising:
   a shielding device provided between the object body and an inner wall surface of the heating furnace and operable between an open state for permitting a stray light to be emitted from the inner wall surface to reach the object body and a closed state for inhibiting the stray light from reaching the object body;
   a radiant-energy detecting means for detecting said intensity value of a radiant energy of said light emitted from the object body while the shielding device is held in said closed state;
   a stray-light noise eliminating means for eliminating an intensity value of a radiant energy of said stray light from said intensity value of a radiant energy of said light emitted from the object body, based on a temperature of said shielding device; and
   a temperature calculating means for calculating a temperature of the object body based on said intensity value of the radiant energy of said light emitted from the object body detected by said radiant-energy detecting means after eliminating said intensity value of radiant energy of said stray light.

6. An apparatus according to claim 5, wherein said light emitted from the surface of said object body is separated into first and second radiations having respective first and second wavelengths, which form respective first and second images having respective picture elements on a multiplicity of photosensitive elements;

said radiant-energy detecting means comprises:
   a first-wavelength radiant-energy detecting means for detecting a radiant intensity value of said first radiation at each of the picture elements of said first image while the shielding device is held in said closed state, wherein said first radiation is selected by using a first filter which permits transmission therethrough of said first radiation having said first wavelength, and is selected according to a radiant intensity curve corresponding to a wavelength of a black body at a lower limit of a range of the temperature to be measured, and which is within a radiant intensity range in which the radiant intensity is higher than a radiant intensity at a normal room temperature, said first filter permitting transmission therethrough of a radiation having a half width which is not larger than 1/20 of said first wavelength; and
   a second-wavelength radiant-energy detecting means for detecting a radiant intensity value of said second radiation at each of the picture elements of said second image while the shielding device is held in said closed state, wherein said second radiation is selected by using a second filter which permits transmission therethrough of said second radiation having said second wavelength, and is within a radiant intensity range such that said second wavelength is different from said first wavelength by a predetermined difference which is not larger than 1/12 of said first wavelength, and which is not smaller than a sum of a half width of said second wavelength;

said stray-light noise eliminating means eliminates intensity values of radiant energy of said stray light having first and second wavelengths from said intensity values of said radiant energy of said light emitted from the object body having said first and second wavelengths, respectively, based on a temperature of said shielding device; and said temperature calculating means comprises obtaining, at each pair of corresponding picture elements of said first and second images, a ratio of the intensity value of the radiant energy of the first radiation detected by the first-wavelength radiant-energy detecting means to the intensity value of the radiant energy of the second radiation detected by the second wavelength radiant-energy detecting means after said intensity values of radiant energy of said stray light have been eliminated by the stray-light noise eliminating means, and calculating the temperature at each pair of picture elements based on the obtained ratios;

wherein a distribution of a surface temperature of said object body in said heating furnace is displayed based on the calculated temperatures.

7. An apparatus according to claim 6, wherein said first filter permits transmission therethrough of a radiation having a half width which is not larger than 1/20 of said first wavelength, while said second filter permits transmission therethrough of a radiation having a half width which is not larger than 1/20 of said second wavelength.

8. An apparatus according to claim 6, wherein said first and second filters have transmittance values whose difference is not higher than 30%.

9. An apparatus according to claim 6, comprising:

a first half mirror for splitting said light emitted from the surface of said object body into two components traveling along respective first and second optical paths which are provided with said first and second filters, respectively;

a second half mirror disposed so as to receive the radiations of said first and second wavelengths from said first and second filters; and and an image detector including a CCD device having said multiplicity of photosensitive elements operable in response to the radiations of said first and second wavelengths, and a lens device which is used to form two images of said object body on said multiplicity of photosensitive elements, on the basis of said radiations of said first and second wavelengths from said second half mirror respectively, such that said two images are spaced apart from each other.

* * * * *